US011330414B2

(12) United States Patent
Hovey et al.

(10) Patent No.: US 11,330,414 B2
(45) Date of Patent: May 10, 2022

(54) PROXIMITY DETERMINATION TO A GEO-FENCE

(71) Applicant: QUALCOMM Incorporated, San Diego, CA (US)

(72) Inventors: Richard Reid Hovey, Branchburg, NJ (US); Hong Cheng, Bridgewater, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/752,568

(22) Filed: Jan. 24, 2020

(65) Prior Publication Data

US 2021/0235246 A1    Jul. 29, 2021

(51) Int. Cl.
*H04W 4/70*    (2018.01)
*H04L 5/00*    (2006.01)
(Continued)

(52) U.S. Cl.
CPC ............. *H04W 4/70* (2018.02); *H04L 5/0055* (2013.01); *H04W 4/021* (2013.01); *H04W 16/28* (2013.01);
(Continued)

(58) Field of Classification Search
CPC ............. H04W 8/005; H04W 72/0413; H04W 72/1215; H04W 40/20; H04W 52/246;
(Continued)

(56) References Cited

U.S. PATENT DOCUMENTS 8,205,246 B2 * 6/2012 Shatzkamer .......... H04L 69/161
726/4
8,769,629 B2 * 7/2014 Shatzkamer ........ H04L 63/0236
726/4
(Continued)

FOREIGN PATENT DOCUMENTS

EP    2760227 A2 *  7/2014  ........... H04B 5/0031
EP    3128804 A1 *  2/2017
(Continued)

OTHER PUBLICATIONS

Interference Mitigation in D2D Communication Underlaying LTE-A Network by Ghazanfar Ali Safdar; Masood Ur-Rehman; Mujahid Muhammad; Muhammad Ali Imran; Rahim Tafazolli Published in: IEEE Access ( vol. 4) Oct. 2016 (Year: 2016).*

(Continued)

*Primary Examiner* — William D Cumming
(74) *Attorney, Agent, or Firm* — Thien T. Nguyen

(57) ABSTRACT

Techniques for device to device (D2D) wireless communication are provided. In an aspect, a first user equipment (UE) receives device-to-device (D2D) information from a second user equipment (UE). The first UE determines whether the first UE is within a threshold range from the second UE based on the D2D information. Application layer processing is enabled for a message in the D2D information, if the first UE is within the threshold range. The message is blocked from the application layer, if the first UE is not within the threshold range from the second UE.

54 Claims, 18 Drawing Sheets

(51) Int. Cl.
*H04W 4/021* (2018.01)
*H04W 16/28* (2009.01)
*H04W 80/02* (2009.01)
*H04W 80/12* (2009.01)
*H04W 92/18* (2009.01)

(52) U.S. Cl.
CPC ........... *H04W 80/02* (2013.01); *H04W 80/12* (2013.01); *H04W 92/18* (2013.01)

(58) Field of Classification Search
CPC ..... H04W 48/20; H04W 24/10; H04W 4/021; H04W 16/28; H04W 72/0453
USPC ........................................ 455/456.1; 370/401
See application file for complete search history.

(56) References Cited

U.S. PATENT DOCUMENTS

| | | | | |
|---|---|---|---|---|
| 9,648,651 | B2* | 5/2017 | Edge | H04L 67/12 |
| 9,788,146 | B2* | 10/2017 | Kosseifi | H04W 4/021 |
| 9,819,627 | B2* | 11/2017 | Cao | H04L 51/20 |
| 10,091,710 | B2* | 10/2018 | Van Phan | H04W 48/20 |
| 10,129,345 | B2* | 11/2018 | Wiesen | G06Q 50/01 |
| 10,249,185 | B2* | 4/2019 | Siminoff | G08B 13/19619 |
| 10,440,588 | B2* | 10/2019 | Castell | H04W 40/20 |
| 10,531,266 | B2* | 1/2020 | Rauner | G08B 25/006 |
| 10,645,633 | B2* | 5/2020 | Chen | H04W 48/06 |
| 10,685,381 | B2* | 6/2020 | Duque de Souza | H04L 67/22 |
| 10,849,079 | B2* | 11/2020 | Khati | H04W 52/246 |
| 10,891,176 | B1* | 1/2021 | Miedema | G06F 9/546 |
| 10,958,649 | B2* | 3/2021 | Delcourt | H04L 63/0823 |
| 11,012,834 | B2* | 5/2021 | el Essaili | H04W 4/40 |
| 11,196,694 | B2* | 12/2021 | Werner | H04L 51/12 |
| 2008/0279200 | A1* | 11/2008 | Shatzkamer | H04L 69/161 370/401 |
| 2012/0227093 | A1* | 9/2012 | Shatzkamer | H04L 63/102 726/4 |
| 2013/0007847 | A1 | 1/2013 | Plattner et al. | |
| 2013/0316727 | A1* | 11/2013 | Edge | H04L 67/12 455/456.1 |
| 2016/0219394 | A1* | 7/2016 | Van Phan | H04W 72/0453 |
| 2018/0035310 | A1* | 2/2018 | Castell | H04W 8/005 |
| 2018/0234909 | A1* | 8/2018 | Chen | H04W 48/08 |
| 2018/0235015 | A1* | 8/2018 | Musgrove | H04W 4/90 |
| 2018/0284752 | A1* | 10/2018 | Cella | H04L 1/18 |
| 2019/0122264 | A1* | 4/2019 | Duque de Souza | G06Q 30/0266 |
| 2019/0140864 | A1* | 5/2019 | Gupta | H04W 72/1215 |
| 2019/0141694 | A1* | 5/2019 | Gupta | H04W 24/10 |
| 2019/0150003 | A1* | 5/2019 | He | H04W 16/28 342/368 |
| 2019/0166480 | A1* | 5/2019 | Rauner | H04W 4/023 |
| 2019/0239186 | A1 | 8/2019 | Tugnawat et al. | |
| 2019/0297079 | A1* | 9/2019 | Delcourt | G06F 21/554 |
| 2019/0327787 | A1* | 10/2019 | Musgrove | H04W 4/02 |
| 2019/0364492 | A1* | 11/2019 | Azizi | H04W 48/16 |
| 2020/0008121 | A1* | 1/2020 | Wu | H04W 4/021 |
| 2020/0059915 | A1* | 2/2020 | Lee | H04W 72/0406 |
| 2020/0092691 | A1* | 3/2020 | el Essaili | H04W 60/06 |
| 2020/0100048 | A1* | 3/2020 | Wu | H04L 5/0055 |
| 2020/0100195 | A1* | 3/2020 | Khati | H04W 8/005 |
| 2020/0260214 | A1* | 8/2020 | Wu | H04L 1/1685 |
| 2020/0267122 | A1* | 8/2020 | Verma | H04W 12/088 |
| 2020/0359445 | A1* | 11/2020 | Wu | H04B 7/0626 |
| 2021/0042172 | A1* | 2/2021 | Miedema | G06F 9/546 |
| 2021/0042173 | A1* | 2/2021 | Prakash | G06F 9/546 |
| 2021/0084000 | A1* | 3/2021 | Brogan | H04L 51/20 |
| 2021/0084558 | A1* | 3/2021 | Speicher | H04W 36/08 |
| 2021/0084559 | A1* | 3/2021 | Chaponniere | H04W 36/08 |
| 2021/0235246 | A1* | 7/2021 | Hovey | H04L 5/0055 |
| 2021/0314436 | A1* | 10/2021 | Kreiner | H04M 3/42059 |

FOREIGN PATENT DOCUMENTS

JP 2017514401 A * 6/2017
WO 2019195138 A1 10/2019

OTHER PUBLICATIONS

RRC and MAC call flow procedures for D2D communication through sidelink in LTE-A by K P Sharmila • Anjali • Surya Pattar Published in: 2016 IEEE International Conference on Recent Trends in Electronics, Information & Communication Technology (RTEICT) (pp. 851-854) Jan. 2017 (Year: 2017).*
A. Bagayoko, D. Panaitopol and C. Mouton, "On the Feasibility of Cellular Resource Reuse for Device-to-Device Communication under 3GPP Network Constraints," European Wireless May 2014; 20th European Wireless Conference, 2014, pp. 1-8. (Year: 2014).*
International Search Report and Written Opinion—PCT/US2021/014350—ISA/EPO—dated May 11, 2021.

* cited by examiner

| Data Element (DE) | New Application-Layer Data Elements | |
|---|---|---|
| | Description | Use |
| ProximityAlertType | Enumerated List:<br>• Pedestrian<br>• Cyclist<br>• Animal<br>• Vehicle<br>• Other | • Alert vehicle to presence of entity within distance threshold, or,<br>• Alert tag bearer to presence of vehicle within distance threshold |
| GeoFenceAlert | Enumerated List:<br>• AudibleAlert<br>• HapticAlert<br>• Other | Direct warning or action for tag to issue to tag bearer |
| GeoFenceMotionInstruction | J2735 DE_Angle value<br>• Initiate movement in the direction defined by the Angle value | Direct tag bearer to move in a specific direction |

*FIG. 10*

| Proximity Alert Message ||
|---|---|
| Message Part | Example Contents |
| Originator Parameters | Identity |
| | Static Characteristics |
| | Dynamic Characteristics |
| | Type: Proximity Alert Request<br>Type: Proximity Alert Response |
| Proximity Alert Components | ProximityAlertType |
| | GeoFenceAlert |
| | GeoFenceMotionInstruction |

New Application-Layer Message (selected elements)

*FIG. 11*

PROXIMITY DETERMINATION TO A GEO-FENCE

BACKGROUND

Various aspects described herein generally relate to wireless communication systems, and more particularly, to determining a proximity to a geo-fence and optionally invoking actions based on the proximity. In some aspects the geo-fence can be determined based on received information in a device-to-device communication.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard, also referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor, for example. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Existing wireless hazard alert systems require always-on broadcast and application layer message processing resulting in increased power consumption and additional RF congestion. Hazard alerts may be related to vehicles and non-vehicle entities. For example, from June 2017 to June 2018, 1.33 million collisions between vehicles and deer, elk, moose or caribou occurred in the US. For example, deer-vehicle collisions alone result in about 200 human deaths and $1.1 billion in property damage each year, with an additional $3 billion spent by state and federal governments, insurance companies and drivers to reduce and manage animal to vehicle collisions.

Leveraging 5G increased data rates, decreased latency, and speed plus distance sensitive physical layer (PHY) and medium access control layer (MAC) (PHY-MAC), Vehicle-to-Everything (V2X) communication technologies are being implemented to support various driving applications, such as wireless communications between vehicles, between vehicles and the roadside infrastructure, between vehicles and pedestrians, etc. Accordingly, it would be beneficial to leverage V2X communication technologies to implement collision deterrence systems to reduce loss of property and life.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In accordance with the various aspects disclosed herein, at least one aspect includes, a method for wireless communication at a first user equipment (UE), including: receiving device-to-device (D2D) information from a second user equipment (UE); determining whether the first UE is within a threshold range from the second UE based on the D2D information; and enabling application layer message in the D2D information, if the first UE is within the threshold range from the second UE.

In accordance with the various aspects disclosed herein, at least one aspect includes, a first user equipment (UE) including: a transceiver; at least one processor coupled to a memory and to the transceiver, the at least one processor in cooperation with the transceiver being configured to: receive device-to-device (D2D) information from a second user equipment (UE); determine whether the first UE is within a threshold range from the second UE based on the D2D information; and enable application layer processing of a message in the D2D information, if the first UE is within the threshold range from the second UE.

In accordance with the various aspects disclosed herein, at least one aspect includes, a first user equipment (UE) including: means for receiving device-to-device (D2D) information from a second user equipment (UE); means for determining whether the first UE is within a threshold range from the second UE based on the D2D information; and means for enabling application layer processing of a message in the D2D information, if the first UE is within the threshold range from the second UE.

In accordance with the various aspects disclosed herein, at least one aspect includes, a non-transitory computer-readable medium storing computer-executable instructions for wireless communication at a first user equipment (UE), the computer-executable instructions including: at least one instruction configured to receive device-to-device (D2D) information from a second user equipment (UE); at least one instruction configured to determine whether the first UE is within a threshold range from the second UE based on the D2D information; and at least one instruction configured to enable application layer processing of a message in the D2D information, if the first UE is within the threshold range from the second UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIG. 10 illustrates data elements used in D2D messaging according to aspects of the disclosure.

FIG. 11 illustrates new messages used in D2D messaging according to aspects of the disclosure.

DETAILED DESCRIPTION

Figure 1:
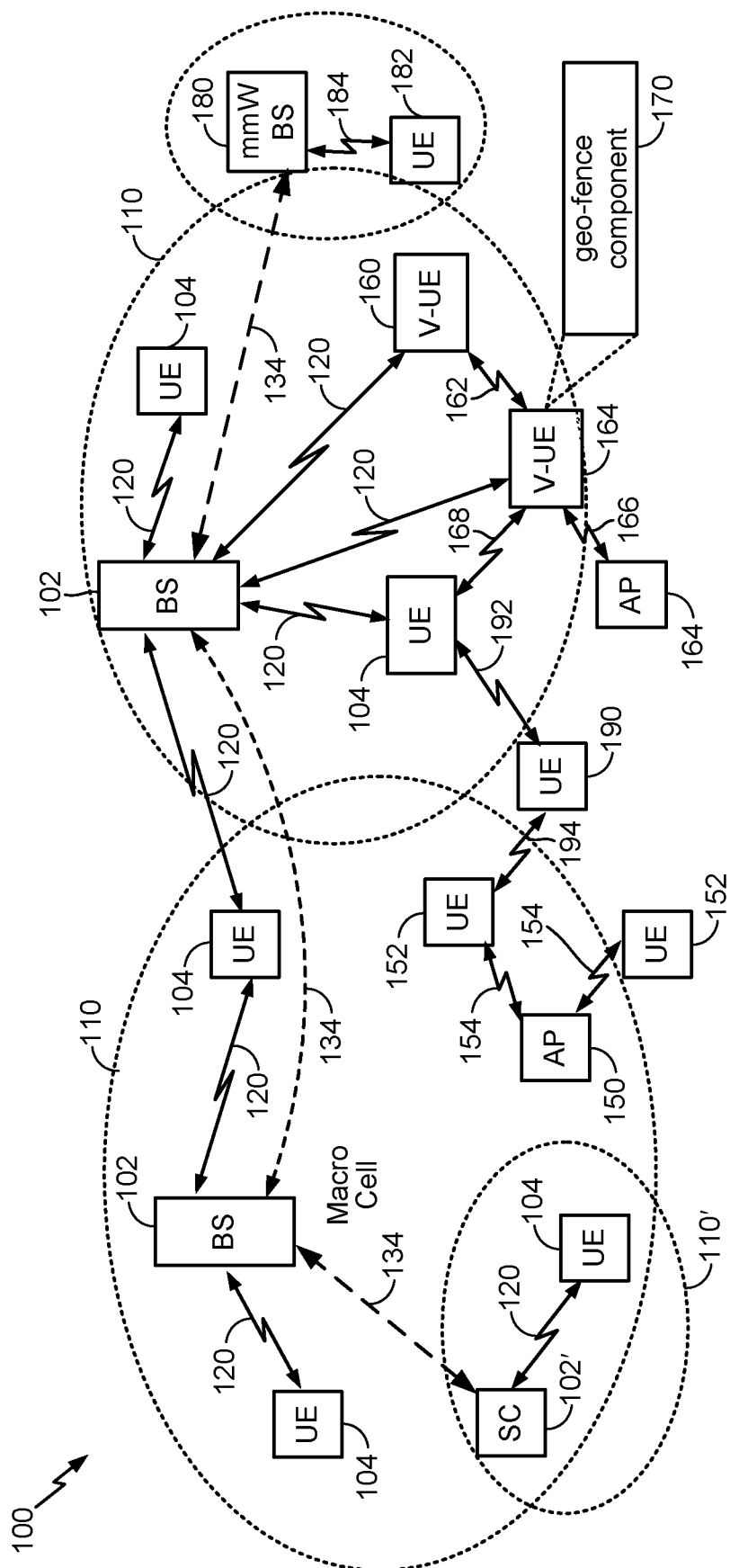
FIG. 1 illustrates an exemplary wireless communications system in accordance with one or more aspects of the disclosure.

Disclosed are techniques for establishing a geofence that moves with the UE (e.g., vehicle-mounted UE, animal-mounted UE (e.g., tag), pedestrian UE, etc.) using 5G NR D2D communications. For example, C-V2X communication enables one-to-one (device-to-device) and one-to-many infrastructure-less communication, as well as infrastructure-mediated communication. The moving geofence by can be established by exposing 5G NR embedded controls from the physical layer (PHY) and/or media access control layer (MAC) also referred herein as PHY-MAC embedded controls to the application layer. This allows for reduced device power consumption by repurposing the 5G NR PHY-MAC control message mechanisms to enable or disable application layer message processing. Specifically, when no violation of the geo-fence is detected, messages may be blocked from going to the application layer thereby preventing unnecessary message processing at the application layer.

These and other aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "UE," "vehicle UE" (V-UE), on-board unit (OBU) and "base station" are not intended to be specific or otherwise limited to any particular radio access technology (RAT), unless otherwise noted. In general, the user devices will be referred herein as UEs and as such UEs may be any wireless communication device (e.g., a vehicle onboard computer, a vehicle navigation device, a mobile phone, a router, a tablet computer, a laptop computer, a tracking device, an Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. A V-UE or OBU may be any in-vehicle wireless communication device, such as a navigation system, a warning system, a heads-up display (HUD), etc. Alternatively, a V-UE may be a portable wireless communication device (e.g., a cell phone, tablet computer, etc.) that belongs to the driver of the vehicle or a passenger in the vehicle. The term "V-UE" may refer to the in-vehicle wireless communication device or the vehicle itself, depending on the context. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102.

The term "cell" refers to a logical communication entity used for communication with a base station 102 (e.g., over a carrier frequency), and may be associated with an identifier for distinguishing neighboring cells (e.g., a physical cell identifier (PCID), an enhanced cell identifier (E-CID), a virtual cell identifier (VCID), etc.) operating via the same or a different carrier frequency. In some examples, a carrier frequency may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 gigahertz (GHz)). When communicating in an unlicensed frequency spectrum, the UEs 152 (WLAN STAs) and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with 'UE 152, a WLAN STA, connected to the WLAN AP 150 (through which UE 190 may indirectly obtain WLAN-based Internet connectivity). In an example, the D2D P2P links 192-194 may be supported with any well-known D2D RAT, such as LTE Direct (LTE-D), WiFi Direct (WiFi-D), Bluetooth®, and so on.

Leveraging 5G increased data rates, decreased latency, and speed plus distance sensitive physical layer (PHY) and medium access control layer (MAC) (PHY-MAC), Vehicle-to-Everything (V2X) communication technologies are being implemented to support Intelligent Transportation Systems (ITS) applications, such as wireless communications between vehicles (Vehicle-to-Vehicle (V2V)), between vehicles and the roadside infrastructure (Vehicle-to-Infrastructure (V2I)), and between vehicles and pedestrians (Vehicle-to-Pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. As discussed above, aspects disclosed herein may use geo-fences to reduce collisions.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 over a sidelink 166, or with UEs 104 over a sidelink 168 using P2P/D2D protocols (e.g., "PC5," an LTE V2X D2D interface) or ProSe direct communications. Sidelink communication may be used for D2D media-sharing, V2V communication, V2X communication (e.g., cellular V2X (C-V2X) communication), emergency rescue applications, etc. One or more of a group of V-UEs 160 utilizing D2D communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via D2D communications may utilize a one-to-many (1:M) system in which each V-UE 160 transmits to every other V-UE 160 in the group. In some cases, a base station 102 facilitates the scheduling of resources for D2D communications. In other cases, D2D communications are carried out between V-UEs 160 without the involvement of a base station 102.

In an aspect, the V-UEs 160, and any other UE illustrated in FIG. 1, may have a component 170 that determines proximity to a geo-fence also referred to herein as geo-fence component 170. The geo-fence component 170 may be a hardware, software, or firmware component that, when executed, causes the V-UE 160 to perform the operations described herein. For example, the geo-fence component 170 may be a software module stored in a memory of the V-UE 160 and executable by a processor of the V-UE 160. As another example, the geo-fence component 170 may be a hardware circuit (e.g., an ASIC, a field programmable gate array (FPGA), etc.) within the V-UE 160. Although discussed herein in the context of collision deterrence for explanation and illustration purposes, it will be appreciated that the geo-fence/proximity-based functionality described herein may be used to perform other functionalities.

In an aspect, the wireless sidelinks 162, 166, 168 may operate over a communication medium of interest, which may be shared with other communications between other vehicles and/or infrastructure access points, as well as other RATs. A "medium" may be composed of one or more frequency, time, and/or space communication resources (e.g., encompassing one or more channels across one or more carriers) associated with communication between one or more transmitter/receiver pairs.

In an aspect, the wireless sidelinks 162, 166, 168 may be C-V2X links. A first generation of C-V2X has been standardized in LTE, and the next generation is expected to be defined in 5G (also referred to as "New Radio" (NR) or "5G NR"). C-V2X is a cellular technology that also enables device-to-device communications. In the U.S. and Europe, C-V2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

Other protocols for the wireless sidelinks 162, 166, 168 may include dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the unlicensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of code division multiple access (CDMA) systems, time division multiple access (TDMA) systems, frequency division multiple access (FDMA) systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more P-UEs 104 are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a P-UE 104 may include information about, for example, the position, speed, acceleration, and heading of the V-UE 160 and the position, speed (e.g., where the P-UE 104 is a bicycle), and heading of the P-UE 104. It will be appreciated that terms, such as V-UE 160 and a P-UE 104 are used herein for convenience of illustration and not limitation of specific applications, device types, etc. It will be appreciated that these devices along with others referenced herein are also referred to using the general term UE, which applies to any of the user equipment devices referenced herein.

Figure 2A:
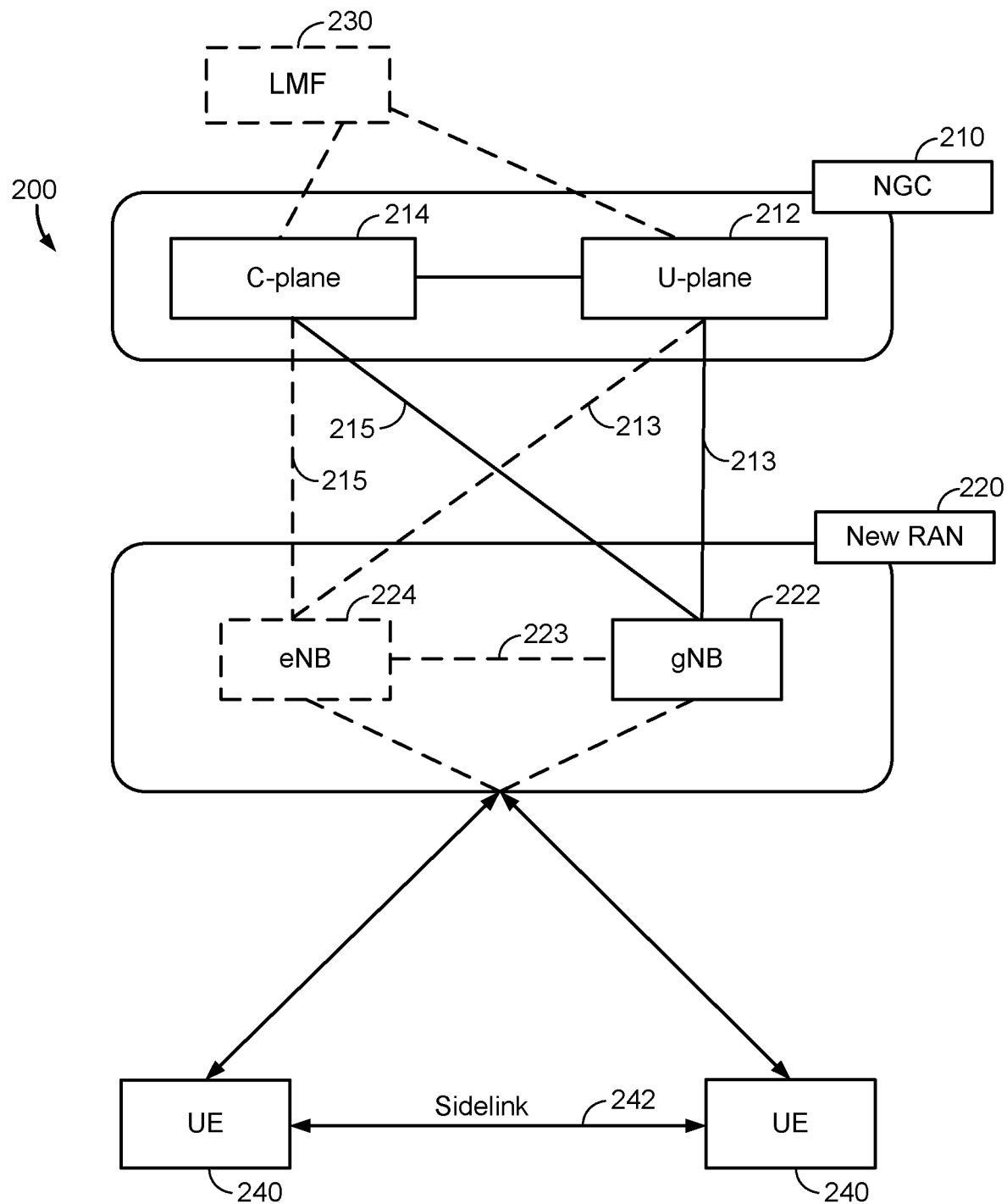
FIGS. 2A and 2B illustrate example wireless network structures, according to various aspects.

FIG. 2A illustrates an example wireless network structure 200 according to one or more aspects. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) that operate cooperatively to form the core network. User plane interface (NG-U) 213 and control plane interface (NG-C) 215 connect one or more gNBs 222 to the NGC 210 and specifically to the control plane functions 214 and user plane functions 212. In an additional configuration, one or more eNBs 224 may also be connected to the NGC 210 via NG-C 215 to the control plane functions 214 and NG-U 213 to user plane functions 212. Further, eNB(s) 224 may directly communicate with gNB(s) 222 via a backhaul connection 223. Accordingly, in some configurations, the New RAN 220 may only have one or more gNBs 222, while other configurations include one or more of both eNBs 224 and gNBs 222. Either gNB(s) 222 or eNB(s) 224 may communicate with one or more UEs 240 (e.g., any of the UEs depicted in FIG. 1, such as UEs 104, UE 152, UE 160, UE 182, UE 190, etc.). In an aspect, two UEs 240 may communicate with each other over a wireless unicast sidelink 242, which may correspond to wireless sidelink 162 in FIG. 1.

Another optional aspect may include a location management function (LMF) 230 in communication with the NGC 210 to provide location assistance for UEs 240. The LMF 230 determines, using information from the UE 240 and/or the New RAN 220, the current location of the UE 240 and provides it on request. The LMF 230 can be implemented as a plurality of structurally separate servers, or alternately may each correspond to a single server. Although FIG. 2A illustrates the LMF 230 as separate from the NGC 210 and the New RAN 220, it may instead be integrated into one or more components of the NGC 210 or the New RAN 220.

Figure 2B:
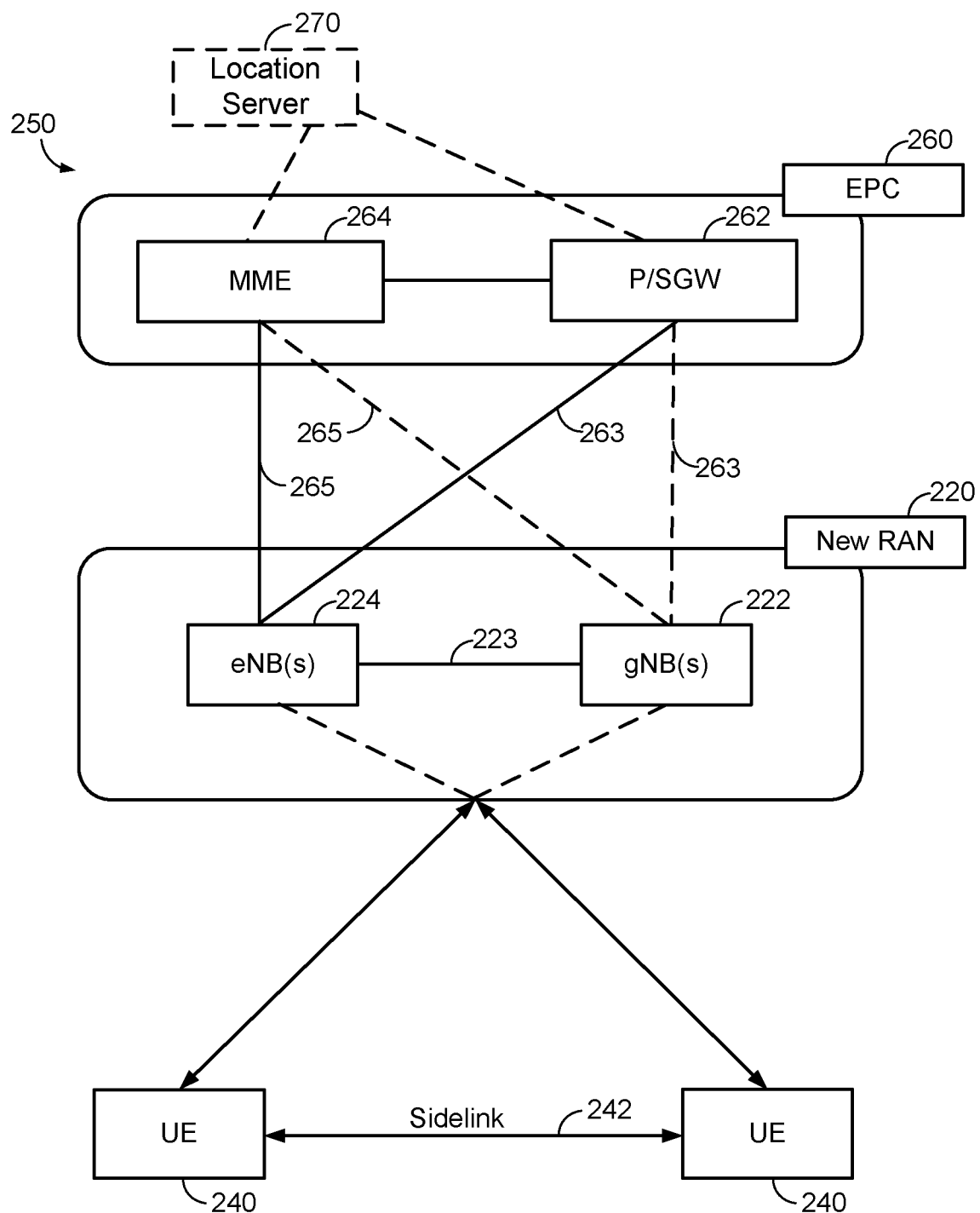

FIG. 2B illustrates an example wireless network structure 250 according to one or more aspects. For example, Evolved Packet Core (EPC) 260 can be viewed functionally as control plane functions, i.e., Mobility Management Entity (MME) 264, and user plane functions, i.e., Packet Data Network Gateway/Serving Gateway (P/SGW) 262, which operate cooperatively to form the core network. S1 control plane interface (S1-MME) 265 and S1 user plane interface (S1-U) 263 connect one or more eNBs 224 to the EPC 260, and specifically to MME 264 and P/SGW 262, respectively. In an additional configuration, one or more gNBs 222 may also be connected to the EPC 260 via S1-MME 265 to MME 264 and S1-U 263 to P/SGW 262. Further, eNB(s) 224 may directly communicate with one or more gNBs 222 via the backhaul connection 223, with or without gNB direct connectivity to the EPC 260. Accordingly, in some configurations, the New RAN 220 may only have gNB(s) 222, while other configurations include both eNB(s) 224 and gNB(s) 222. Either gNB(s) 222 or eNB(s) 224 may communicate with one or more UEs 240 (e.g., any of the UEs depicted in FIG. 1, such as UEs 104, UE 182, UE 190, etc.). In an aspect, two UEs 240 may communicate with each other over a wireless sidelink 242, which may correspond to wireless unicast sidelink 162 in FIG. 1.

Another optional aspect may include a location server 270 that may be in communication with the EPC 260 to provide location assistance for UE(s) 240. In an aspect, the location server 270 may be an Evolved Serving Mobile Location Center (E-SMLC), a Secure User Plane Location (SUPL) Location Platform (SLP), a Gateway Mobile Location Center (GMLC), or the like. The location server 270 can be implemented as a plurality of structurally separate servers, or alternately may each correspond to a single server. The location server 270 can be configured to support one or more location services for UE(s) 240 that can connect to the location server 270 via the core network, EPC 260, and/or via the Internet (not illustrated).

Figure 3:
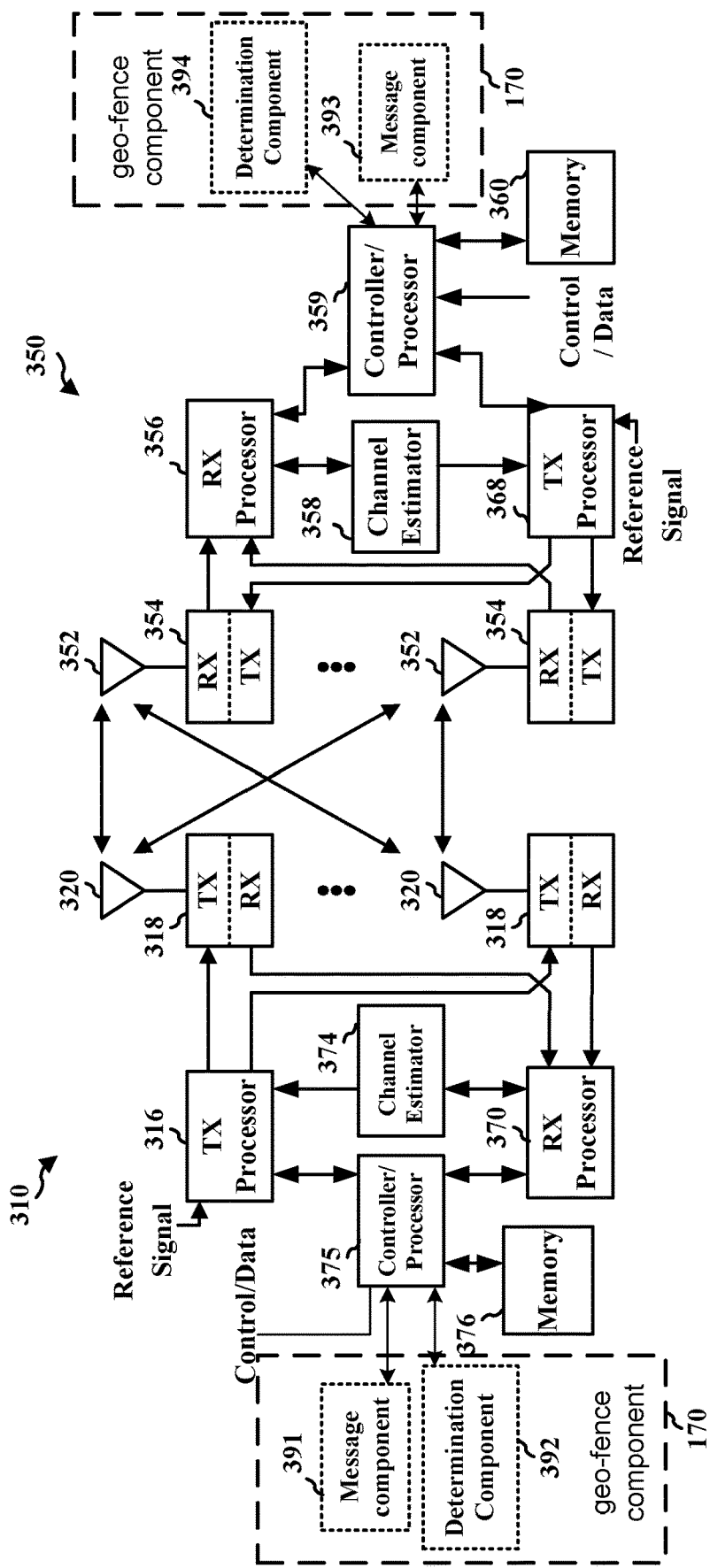
FIG. 3 illustrates an example of wireless communication devices in a wireless communications system in accordance with aspects of the disclosure.

FIG. 3 is a block diagram 300 of a first wireless communication device 310 in communication with a second wireless communication device 350 via V2V/C-V2X/V2X/D2D communication, e.g., via sidelink. The device 350 may comprise a UE communicating with other another device 350 via V2V/C-V2X/V2X/D2D communication, e.g., via sidelink. The first wireless communication device 310 may comprise a UE communicating with another UE, e.g., device 350, via sidelink. In addition to the other components illustrated in FIG. 3, devices 310 and 350 may each comprise a message component 391, 393 and/or a determination component 392, 394 within geo-fence component 170 or functionally cooperating with geo-fence component 170. The message component 391, 393 may be configured to generate a message having a first indication of a geographic area associated with the message, the geographic area based at least in part on the geographic location of the device 310, 350 that transmits the message. The determination component 392, 394 may be configured to determine whether the receiving device 310, 350 is within a threshold range of a transmitting device 310, 350 and/or to send a feedback for the message based on the first indication of the geographic area associated with the message and the geographic location of the receiving device 310, 350. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Wireless communication may include multicast communication directly between UEs. As an example, multicast sidelink communication may be performed via a PC5 interface. UEs may communicate using sidelink multicast based on V2X communication, V2V communication, or D2D communication, for example. A multicast may involve a transmission from one UE that is intended to be decoded by UEs that are part of a service group. A service group may comprise one or more UEs. A group ID identifying the service group may be comprised in the message, e.g., in Sidelink Control Information (SCI) of the multicast message, and/or as part of the MAC layer destination address.

In a PC5 multicast, a transmitting UE may ensure that all intended receivers in the service group and in proximity of the transmitting UE accurately receive the message. If the intended receivers in the service group that are in the proximity of the transmitting UE do not receive the message accurately, the transmitting UE may retransmit the message in order to ensure accurate receipt of the message.

In order to improve reliability, feedback may be sent back from the receiving UEs in the service group. For example, if a particular UE in the service group does not correctly receive the message, the UE may transmit a NACK, e.g., via sidelink, indicating to the transmitting UE that there was an error in receiving the message. In response to the NACK, the transmitting UE may retransmit the message.

Figure 4:
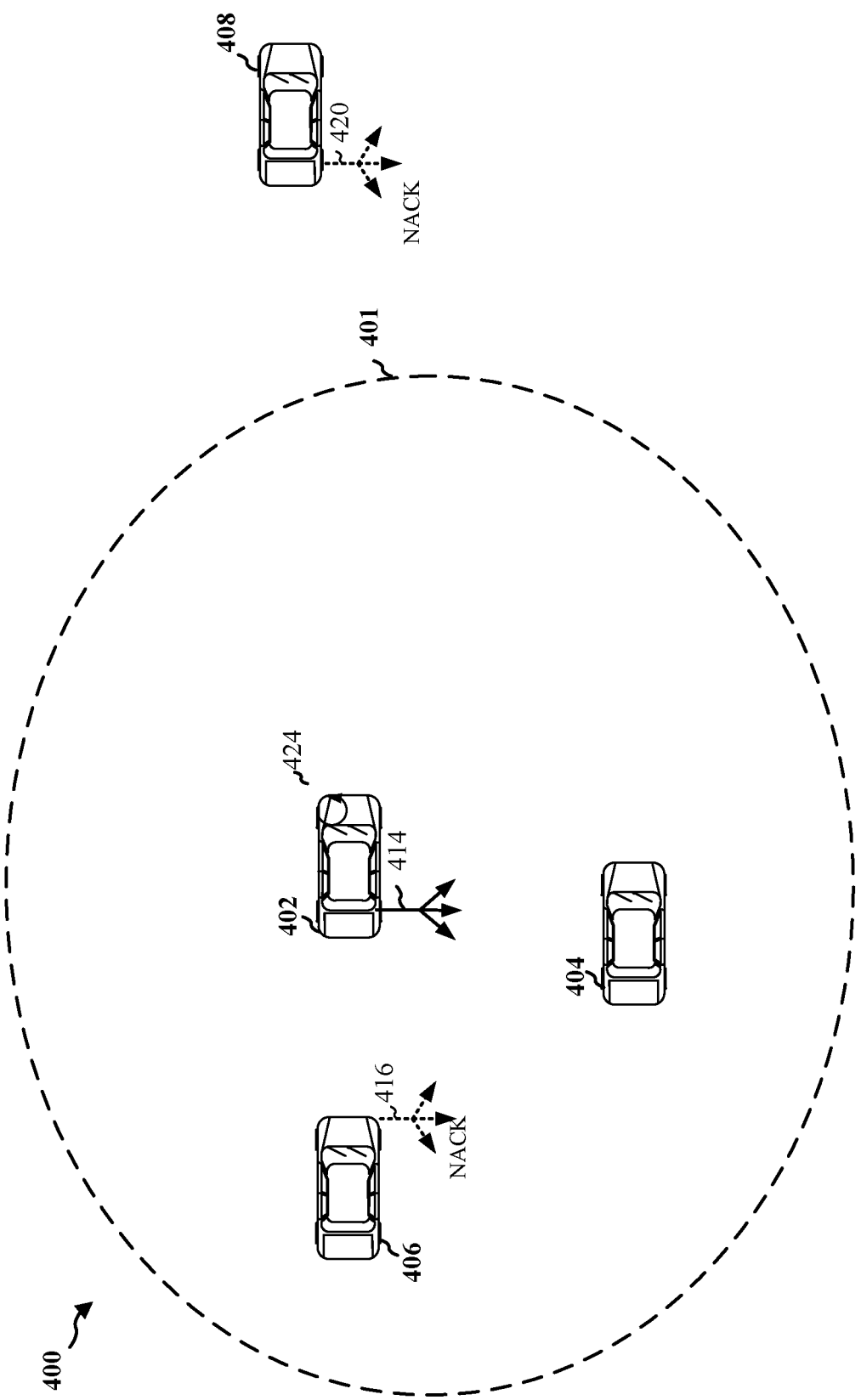
FIG. 4 illustrates an example of communication between UEs in accordance with aspects of the disclosure.

FIG. 4 illustrates an example of communication 400 between multiple UEs, e.g., based on C-V2X/V2X/V2V/D2D communication. UE 402 may be a transmitting UE that multicasts message 414 for a service group. UEs 404, 406, and 408 may be associated with the service group. UE 404 may have correctly received the message 414 and does not transmit a NACK. UE 406 may have experienced an error in receiving the message. Thus, UE 406 may transmit a NACK 416 indicating to UE 402 that the message was not accurately received. In response to the NACK 416, the transmitting UE 402 may determine, e.g., at 424, to retransmit the message 414. However, negative feedback, e.g., NACK(s), may be received from far away receivers that are outside the desired proximity of the transmitting UE 402. As illustrated in FIG. 4, the UE may intend for UEs within range/area 401 to receive the message reliably. UE 408 that is outside the intended area 401 and that is not proximate to UE 402 may receive at least a part of the message and send a NACK 420 to UE 402. However, UE 408 may be at such a distance that UE 408 will likely never receive the message 414 correctly even with a retransmission from UE 402. Additionally, based on the service requirement, there may be no need for the UE at that distance, e.g. UE 408, to receive the message, because the message becomes irrelevant.

Thus, NACK(s) may be received from receiving UEs associated with the service group yet that are at such a distance that it would be futile for the transmitter to retransmit the message. Such futile retransmissions would degrade overall system performance through an inefficient use of wireless resources and through unnecessary potential interference to other wireless communication. While a group ID, e.g., a common destination ID, may be used to identify a multicast service group, in an ad hoc C-V2X/V2X/V2V/D2D environment, it may be difficult to manage or establish a common group identifier that is known only to vehicles in the service group that are also in the proximity of the transmitting UE because of the highly mobile nature of the transmitters and/or receivers.

Aspects are presented that limit feedback from receivers, e.g., receiving UEs, outside of an intended geographical area by providing information that enables a receiver to determine whether it is an intended receiver of the message. The receiver can then determine whether to send feedback based on whether or not the receiver is an intended receiver of the message. A transmitting device, e.g., 402, may indicate geographic area information in each multicast message indicating that receivers, e.g., 404, 406 that are within the indicated geographic area, e.g., 401, are intended to receive the message reliably and should send feedback to help improve the multicast. This may help a receiver outside of the intended area, e.g., UE 408, to determine that it does not need to send feedback. Thus, the geographic area information helps to limit feedback from receivers in the service group that are not in proximity to the transmitter. While the problems have been described using an illustration of C-V2X/V2X/V2V/D2D communication between UEs 402, 404, 406, 408, the concepts are equally applicable to a base station, RSU, mobile UE, vehicle UE etc. that are engaged in PC5 based communication.

In order to reduce the amount of overhead to encode the geographic area information in the message, the geographic area may be indicated using predefined zones or areas. For example, a geographic area may be divided into a series of rectangular zones of uniform size. The geographic area may be limited or could extend to encompass the entire earth surface. However, the various aspects disclosed herein are not limited these examples. The predefined zones or areas, for example, a zone ID or an area ID may be encoded in the message. In one example, the zone/area intended to reliably receive the message may comprise a circular area centered on the location of the transmitting device, e.g., UE 402 or other transmitter engaged in PC5 communication, and extending to a radius indicated to the receiving devices. In another example, predefined zones may have a non-circular shape, e.g., with a region divided into a set of rectangular, hexagon, or other shaped zones, each having a corresponding zone ID. In yet another example, the predefined zones may have a customized shape. For example, the predefined zones may follow a contour of a road, a driving direction, a shape of a geographic feature, etc. In another example, hierarchical zones may be organized in different layers. Each layer may correspond to zones of a different size. For example, first layer may correspond to zones having a radius of 50 m, a width of 50 m, etc. A second layer may correspond to zones having a radius of 100 m, a width of 100 m, etc. A third layer may correspond to zones having a radius of 500 m, a width of 500 m, etc. Thus, the transmitting device and receiving device may identify the zone/area that is intended for reliable reception of the message based on a combination of a layer ID and a zone ID corresponding to the layer ID. In another example, zone divisions may be pre-configured to the receiving devices. For example, the zone divisions may be based on global coordinates of the geographic location. Then, the transmitting device may select a corresponding zone from among the pre-configured zone divisions. Receiving and transmitting devices may receive occasional updates for the pre-configured zone divisions.

Figure 5:
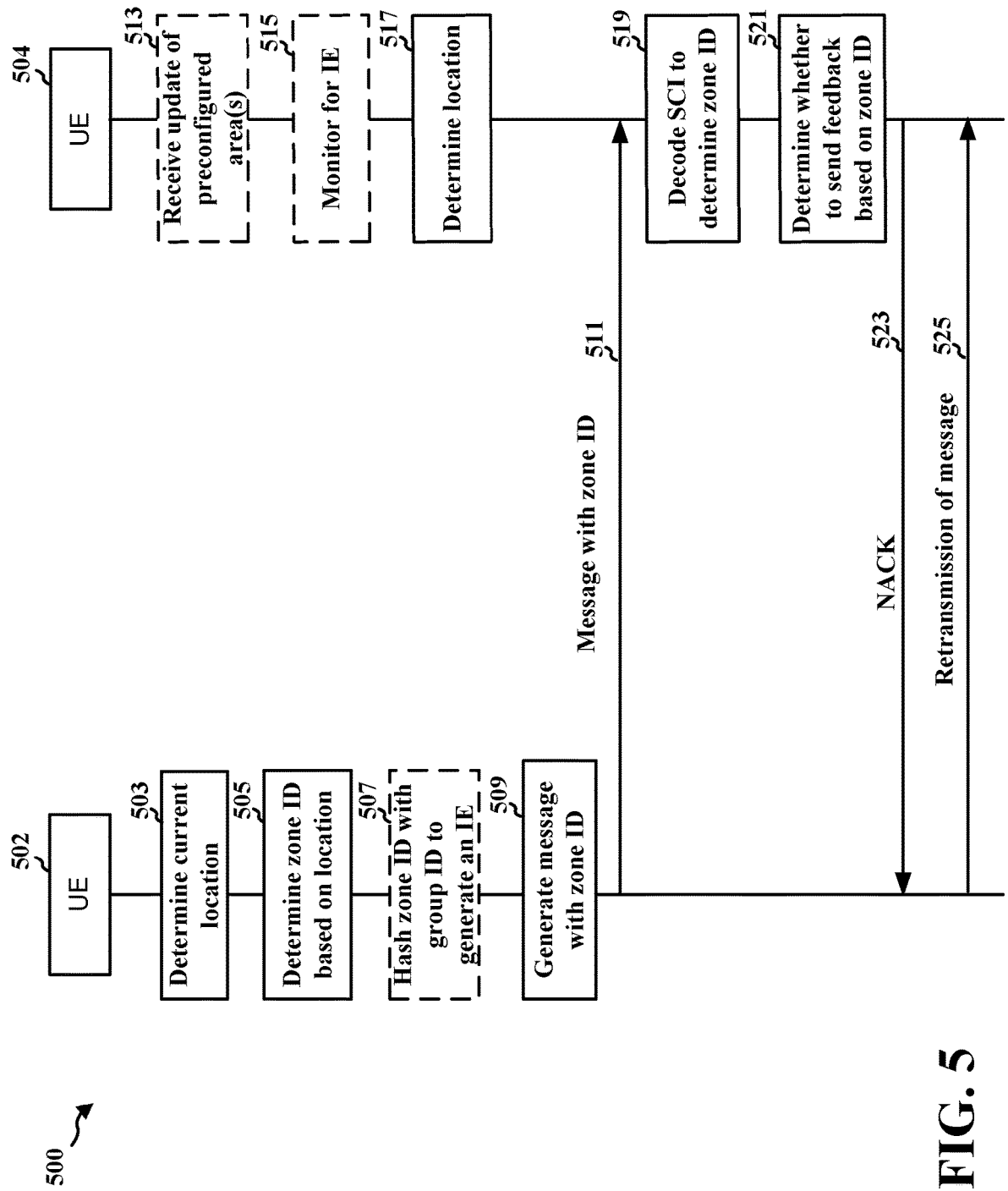
FIG. 5 illustrates an example communication flow between UEs in accordance with aspects of the disclosure.

FIG. 5 illustrates an example communication flow 500 between a transmitting device 502 and a receiving device 504. The communication may be based on C-V2X/V2X/V2V/D2D communication, e.g., PC5 multicast, unicast and/or broadcast communication. In some aspects, the communication may be based on other D2D direct communication, such as ProSe. Although FIG. 5 illustrates an example of communication between a transmitting device 502 and a receiving device 504 that are illustrated as UEs, the concepts are equally applicable to a base station, an RSU, a mobile UE, a vehicle UE, etc. that are engaged in PC5 based communication, C-V2X/V2X/V2V communication or other direct D2D communication. As part of generating a service group message for transmission, e.g., via C-V2X/V2X/V2V/D2D, the transmitting device 502 may determine a zone/area/range for which the message is intended to be reliably received by a receiver in the service group. This may provide a way for the transmitting device 502 to limit feedback to only a receiver(s) within the intended zone/area/range. The transmitting device may determine its current geographic location, at 503, and may use the current location to determine an area/zone/range that is intended to receive the message and for which the transmitting device should receive HARQ feedback. For example, the transmitting device may identify a preconfigured zone in which the transmitting device is currently located. In another example, the zone may be centered on the transmitting device with a selected radius. In another example, the transmitting device may define the zone in another manner or otherwise select the area/range/zone.

As one example, a range may be selected, e.g., based on a Quality of Service (QoS) parameter associated with the multicast. For example, the 5QI for different services may indicate QoS information such as any of a resource type, a priority level for communication, a packet delay budget (PDB) indicating an amount of time that a packet can be delayed, a Packet Error Rate (PER) that indicates a limit on a rate of packet losses, an averaging window, a data burst volume parameter that indicates a limit on the amount of data to be served within a period of time. In addition, the application may indicate a range requirement for the traffic. For example, the range could be in the form of absolute distance, e.g. 500 meters, or in relative levels, e.g. long, medium, or short.

The transmitting device may indicate its current location and a surrounding range in the message. These may be indicated as a zone ID based on the transmitting device's geographical location and a range of the surrounding zones. For example, the transmitting device may indicate an amount or a number, N, of adjacent surrounding zones that are intended to receive the message reliably. If N=1, then the receiving device would need to be within the same zone as the transmitting device in order to be expected to reliably receive the message. If N=2, then a receiving device within the same zone as the transmitting device and within a zone directly adjacent to the zone of the transmitting device would be expected to reliably receive the message. For example, if the zones are of a rectangular shape, the devices expected to reliably receive the message should be in the same zone of the transmitting device and the 8 adjacent zones. If the zones are of a hexagon shape, the devices expected to reliably receive the message should be in the same zone of the transmitting device and the 6 adjacent zone. N may be selected to be any number and is not limited to the examples provided herein.

Once the transmitting device has determined the zone/area/range intended to reliably deliver the message and within which a receiver should send feedback, the transmitting device may generate the message. The message may comprise a control portion and a data portion. The control portion may comprise in the Sidelink Control Information (SCI) an indication of the area/zone/range intended to reliably receive the message. The SCI may also include group ID information corresponding to the service group for the multicast. The group ID information may enable the message to be decoded by receivers that are associated with the service group and that know the group ID. The group ID may be the same as a destination ID or may be different than a destination ID. The group ID may be provided by an application layer, or a mid-ware layer of the UE, or mapped by the V2X layer from the ID provided by the application layer. The group ID may correspond to a higher layer ID or an ID mapped from the higher layer ID, whereas the destination ID corresponds to a lower layer ID. The group ID may be mapped to a destination ID.

In order to further reduce the overhead of transmitting the zone/area/range information in the message, the transmitting device may hash the group ID and the zone ID, at 507, to generate a shortened ID, e.g., an Information Element (IE). The IE may then be embedded in the SCI of the message as part of the generation of the message at 509. After generation at 509, the transmitting device 502 may transmit the message 511, along with the IE.

Receiving device 504 decodes at least a portion of the message, at 519, in order to determine the indication of the range/area/zone intended to receive the message reliably, e.g., zone ID information. The receiving device might receive the control portion of the message, but might not correctly receive the data portion of the message. As the message is not received correctly, the receiving device 504 may need to determine whether to send HARQ feedback, e.g., a NACK, to the transmitting device 502. The receiving device may determine, at 521, whether to send a NACK based on a current location of the receiving device and based on the indication, included in the message, of the range/area/zone intended to receive the message reliably. Thus, the receiving device may determine its current location, at 517 and may determine to send a NACK when the receiving device 504 is within the indicated range/area/zone. For example, the receiving device may send a NACK if the receiving device is in the same zone as the transmitting device, e.g., when N=1, or within a list of surrounding zones, when N>1. The surrounding zones may be based on a range/number/amount indicated to the receiving device 504. In another example, the range/number/amount of surrounding zones may be a function of a QoS for the multicast service. The QoS may be configured via RRC or via an upper layer.

The area/zone/range indicated in the message 511 may reference at least one preconfigured zone, the preconfigured zones being preconfigured and stored at the receiving device. As illustrated at 513, the receiving device may receive an update of the preconfigured zone(s)/area(s)/range(s). Although not illustrated, the transmitting device 502 may receive similar updates of the preconfigured zone(s)/area(s)/range(s). At times a device may operate as a transmitting device, and at other times, the same device may operate as a receiving device.

When the indication of the area and/or group ID is comprised in an IE, the receiving device 504 may monitor for at least one IE in SCI of any received messages, at 515. The IE(s) for which the receiving device monitors, at 515, may be based on a predetermined hash of any group ID for multicast services with which the receiving UE is associated hashed with surrounding zone IDs. As the receiving device may be mobile, the surrounding zone IDs may be updated based on the receiving device's current location.

If the UE determines, at 521, that the UE is within the area/zone/range of intended reliable receipt of the message, and the UE has not correctly received the message 511, the UE may respond with a NACK 523 to the transmitting device 502. The UE may determine whether to send the NACK based on additional aspects, e.g., whether the receiver is associated with the service group corresponding to a group ID comprised in the message, etc. In response to the NACK 523, the transmitting device 502 may retransmit the message 525 in order to ensure reliable receipt of the message by the receiving device 504.

Figure 6:
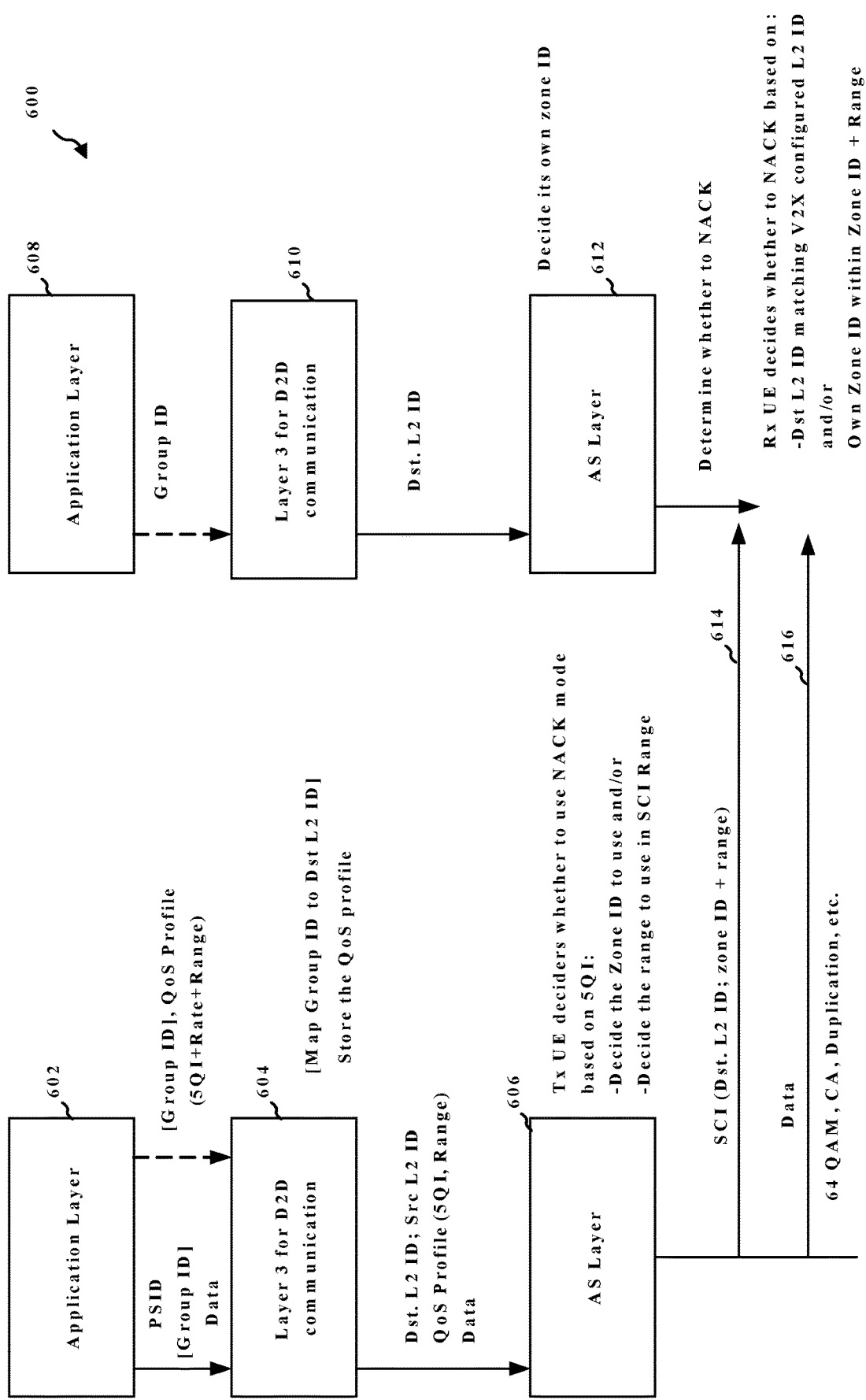
FIG. 6 illustrates an example interaction between different layers at a transmitting device and a receiving device in accordance with aspects of the disclosure.
Figure 7:
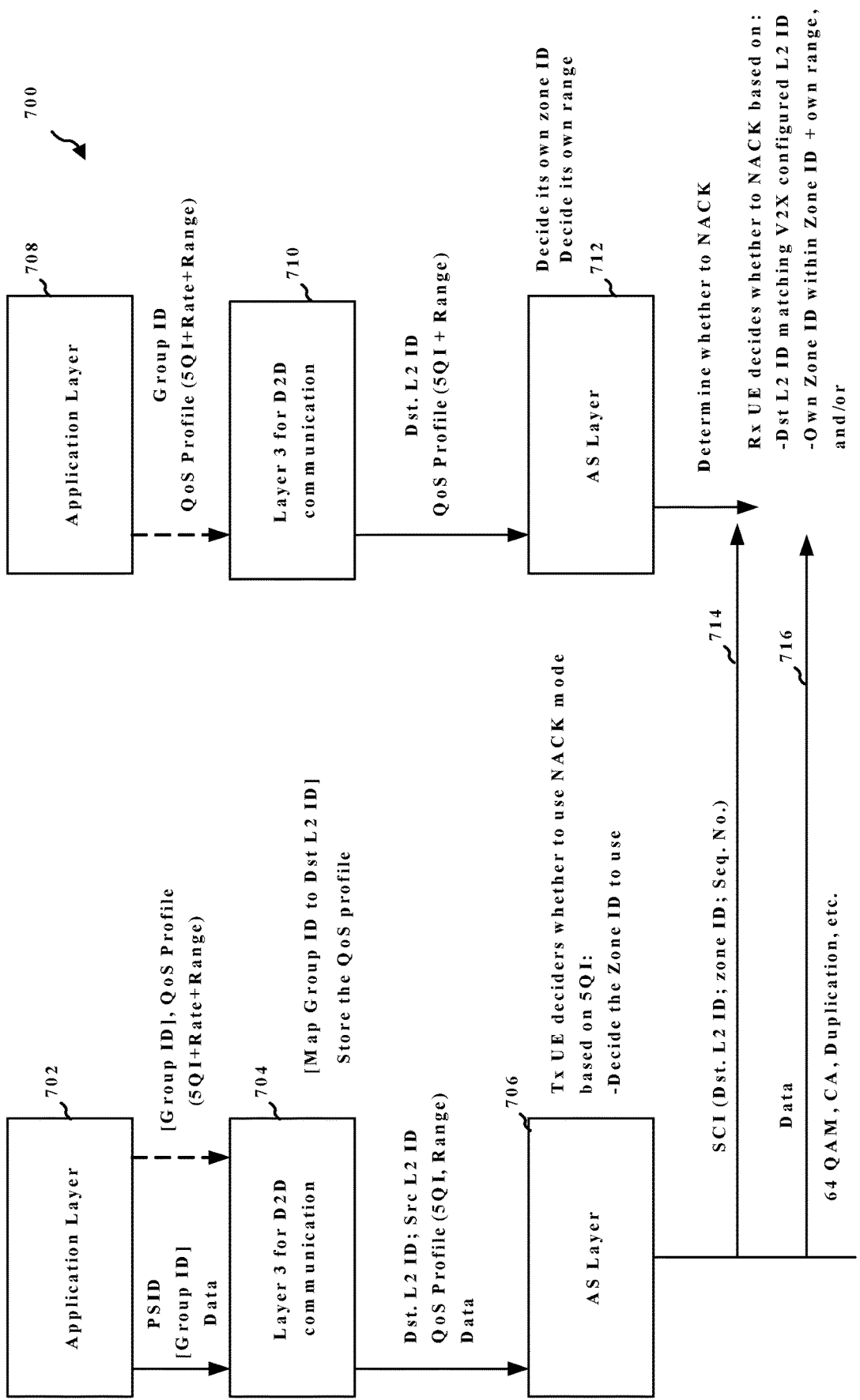
FIG. 7 illustrates an example interaction between different layers at a transmitting device and a receiving device in accordance with aspects of the disclosure.

FIGS. 6 and 7 illustrate examples of interaction between different layers at a transmitting device and a receiving device for the use of a zone ID for C-V2X/V2X/V2V communication. Although the aspects are presented for a V2X example, the aspects may be applied to other direct D2D communication. In the example 600 in FIG. 6, application layer 602, Layer 3 for D2D communication, e.g., a V2X layer, 604, and Access Stratum (AS) layer 606 are for the transmitting device, e.g., 502. In one example Layer 3 may comprise a V2X layer. In other examples, aspects may be applied to other D2D direct communication, such as ProSe. Application layer 608, Layer 3 for D2D communication, e.g., a V2X layer, 610, and AS layer 612 are for the receiving device, e.g., 504. At the transmitting device, the application layer may provide a group ID and a QoS profile for a particular service group to the Layer 3. The QoS profile may include any of an indication of 5QI for the service group, a rate for the service group, and/or a range for the service group. The application layer 602 may also provide data to the Layer 3 to be transmitted in a message, e.g., a multicast message, to the service group. The data may be provided with a corresponding group ID. The application layer may provide a Provider Service Identifier (PSID) with the data. The Layer 3 may map the group ID received from the application layer to a Destination L2 ID (Dst. L2 ID) for the service group. The Layer 3 may also store the QoS profile for the service group. If the Layer 3 does not provide a QoS Profile to the Layer 3, the Layer 3 may use the PSID to determine a corresponding QoS Profile, e.g., mapping the PSID to a QoS profile. As well, if the application layer does not provide a Group ID to the Layer 3, the Dst. L2 ID determined by the Layer 3 may be based on a mapping of the PSID to the Dst. L2 ID. Such mapping information can be pre-configured on the UE, stored in the (U)SIM card, or provisioned from the network via a dynamic provisioning mechanism, e.g. Open Mobile Alliance (OMA) Device Management (DM) OMA-DM or UE Policy delivery mechanism. The AS layer may receive the Dst. L2 ID, a Source L2 ID, the QoS profile (e.g., including the 5QI and/or range), and data for the service group from the Layer 3. The AS layer may determine whether to use an acknowledgement mode for the multicast, e.g., a NACK mode, based on the 5QI from the QoS profile or local policy. For example, if the 5QI indicates a requirement for high reliability, e.g., very low PER value, the transmitting UE may choose to use the acknowledgement to achieve such high reliability. In the NACK mode, the transmitting device may monitor for feedback, e.g. NACK(s), in order to determine whether to retransmit the message. The AS layer 606 may also determine a zone ID to use in the message. The zone ID may correspond to a zone in which the transmitting device is currently located. The AS layer 606 may also determine a range to use in the message. The range may indicate an additional range either surrounding the transmitting device, or the zone or list of zones in which the receiving device is located, for which the transmitting device intends the message to be reliably received. The range may inform a receiver whether or not it should provide feedback. The transmitting device may then transmit the message, comprising SCI 614 and data 616. The SCI may include information indicating group ID or Dst. L2 ID, the zone ID determined by the AS, and/or the range determined by the AS.

At the receiving device, the application layer 608 provides a group ID, for a service group of which the receiving device is associated, to the Layer 610. The Layer 610 determines a Dst. L2 ID based on the group ID, similar to the mapping performed by the transmitting device's Layer 604. The AS layer 612 at the receiving device determines its own zone ID, e.g. for the zone in which the receiving device is currently located. When the receiving device receives the message, including the SCI 614 and the data 616, the receiving device determines whether to send feedback, e.g., a NACK, if the data part of the message is not received correctly. The receiving device may determine whether to send the NACK based on whether the Dst. L2 ID determines by Layer 610 matches the Dst. L2 ID indicated in the SCI 614 of the message and/or based on whether the zone ID for the receiving device that was determined by the AS 612 matches the zone ID indicated in the SCI 614 or falls within the range of the zone ID indicated in the SCI 614. If the Dst. L2 IDs match and the zone ID of the receiving device falls within the indicated range of the zone ID of the transmitting device, the receiving device may provide a NACK if the data portion of the message is not received, for example. If no Dst. L2 ID is not provided from the Layer 610 to the AS layer 612 at the receiving device, the receiving device may determine not to send a NACK. The SCI may carry the information regarding the Zone ID, Dst. L2 ID, and range in different forms. For example, the zone ID and Dst. L2 ID of the SCI may be hashed to reduce the overhead required to send the message. In that case, the SCI may be of a different format than that used for other V2X message transmission, e.g. broadcast messages. Therefore, an additional bit in SCI may be included in order to differentiate the format of the message, e.g., whether the message is broadcast, multicast, or unicast.

The example 700 in FIG. 7 is similar to the example in FIG. 6. The application layer 702 and the Layer 3 for D2D communication, e.g., a V2X layer, 704 at the transmitting device may function similarly to the example in FIG. 6. In one example Layer 3 may comprise a V2X layer. In other examples, aspects may be applied to other D2D multicast communication, such as ProSe. However, in FIG. 7, the range might not be determined or indicated by the AS layer 706 at the transmitting device. Instead, application layer 708 at the receiving device may provide a QoS profile for the service group to layer 710 at the receiving device. The 5QI and range information may be provided from the layer 710 to the AS layer 712 of the receiving device. The AS layer at the receiving device may then determine not only its own zone ID based on the receiving device's current location, but also the range to be used in determining whether to send feedback. Thus, the SCI 714 sent along with the data 716 from the transmitting device might not include information indicating the range. The receiving device may determine whether to send feedback based on any combination of whether the Dst. L2 ID of the SCI matches that determined by the layer 710, whether the zone ID determined by the AS 712 is within either the zone ID indicated in the SCI 714 plus the range determined by the AS layer 712. Alternatively, the receiving device may determine a range based on its own zone ID, and verify if the zone ID indicated in SCI 714 is within the range. For example, the receiving device might determine not to send a NACK if the Zone ID in the SCI 714 is not in the range of its own zone ID. As explained above, the SCI may include other information to support the operation. For example, it may include an indication of whether the message is a retransmitted message, and a sequence number for the message. In this case, the receiving device may determine whether to send a NACK based on whether it has already received the original transmission of the same message.

Figure 8:
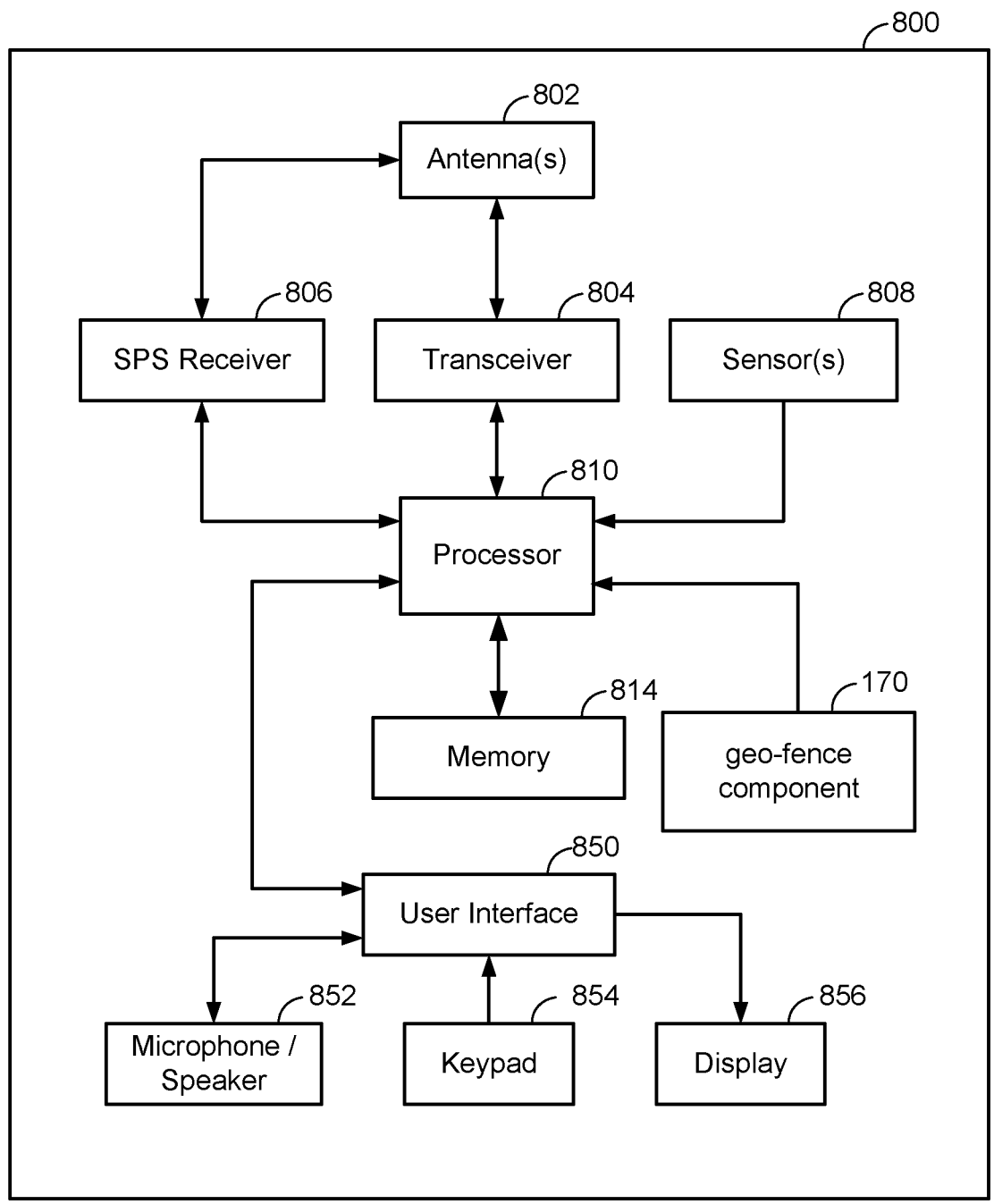
FIG. 8 is a block diagram illustrating various components of an exemplary UE according to at least one aspect of the disclosure.

FIG. 8 is a block diagram illustrating various components of an exemplary UE 800, according to aspects of the disclosure. In an aspect, the UE 800 may correspond to any of UEs described herein, for example, 104, 152, 160, 182, 190 in FIG. 1, UEs 240 in FIGS. 2A and 2B, or UEs 310, 350 in FIG. 3, etc. For the sake of simplicity, the various features and functions illustrated in the block diagram of FIG. 8 are connected together using a common bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 8 may be further subdivided, or two or more of the features or functions illustrated in FIG. 8 may be combined.

The UE 800 may include at least one transceiver 804 connected to one or more antennas 802 for communicating with other network nodes, e.g., other vehicles (e.g., the one or more other V-UEs 160), infrastructure access points (e.g., the one or more roadside access points 164), P-UEs (e.g., the one or more P-UEs 104), base stations (e.g., base stations 102), etc., via at least one designated RAT (e.g., C-V2X or IEEE 802.11p) over a medium of interest utilized by the unicast sidelinks 162. The transceiver 804 may be variously configured for transmitting and encoding signals (e.g., messages, indications, information, and so on), and, conversely, for receiving and decoding signals (e.g., messages, indications, information, pilots, and so on) in accordance with the designated RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The UE 800 may also include a satellite positioning service (SPS) receiver 806. The SPS receiver 806 may be connected to the one or more antennas 802 for receiving satellite signals. The SPS receiver 806 may comprise any suitable hardware and/or software for receiving and processing SPS signals. The SPS receiver 806 requests information and operations as appropriate from the other systems, and performs the calculations necessary to determine the UE's 800 position using measurements obtained by any suitable SPS algorithm.

One or more sensors 808 may be coupled to a processor 810 to provide information related to the state and/or environment of the UE 800, such as speed, heading (e.g., compass heading), headlight status, gas mileage, etc. By way of example, the one or more sensors 808 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processor 810 may include one or more microprocessors, microcontrollers, ASICs, and/or digital signal processors that provide processing functions, as well as other calculation and control functionality. The processor 810 may include any form of logic suitable for performing, or causing the components of the UE 800 to perform, at least the techniques provided herein. In some aspects, the processor 810 may include a modem processor to at least in part perform functions at the PHY layer and MAC layer and an application processor configured at least in part to perform functions at the application layer.

The processor 810 may also be coupled to a memory 814 for storing data and software instructions for executing programmed functionality within the UE 800. The memory 814 may be on-board the processor 810 (e.g., within the same integrated circuit (IC) package), and/or the memory 814 may be external to the processor 810 and functionally coupled over a data bus.

The UE 800 may include a user interface 850 that provides any suitable interface systems, such as a microphone/speaker 852, keypad 854, and display 856 that allow user interaction with the UE 800. The microphone/speaker 852 provides for voice communication services with the UE 800. The keypad 854 comprises any suitable buttons for user input to the UE 800. The display 856 comprises any suitable display, such as, for example, a backlit liquid crystal display (LCD), and may further include a touch screen display for additional user input modes.

In an aspect, the UE 800 may include a geo-fence component 170 functionally coupled to or integrated into the processor 810. The geo-fence component 170 may be a hardware, software, or firmware component that, when executed, causes the UE 800 to perform the operations described herein. For example, the geo-fence component 170 may be a software module stored in memory 814 and executable by the processor 810. As another example, the geo-fence component 170 may be a hardware circuit (e.g., an ASIC, a field programmable gate array (FPGA), etc.) within the UE 800. The functions of the of the geo-fence component 170 will be discussed in greater detail below.

As discussed above, for example, a zone ID or an area ID may be encoded in the message to reduce overhead and allow a determination of a range/distance (e.g., based on zone IDs, layer IDs, etc.) between a transmitting UE and receiving UE that can be associated with a message. For example, the range information for the message may comprise a circular area centered on the location of the transmitting device, or other transmitter engaged in PC5 communication, and extending to a radius indicated to the receiving UEs. Also noted above, various alternative zones may be defined, such as predefined zones including non-circular shapes, each having a corresponding zone ID or may follow a contour of a road, a driving direction, a shape of a geographic feature, etc. Also, as discussed, hierarchical zones may be organized in different layers, where each layer corresponds to zones of a different size (e.g., 50 m, 100 m, etc.) Accordingly, the transmitting device and receiving device may identify the zone/area that is an intended range of the message based on a layer ID and/or a zone ID. In a specific example, a first UE may transmit a message with an intended range (e.g., configured as a zone ID and/or range information) associated with the message. A second UE may receive this message and use the zone ID and/or range information to determine if the second UE is within a threshold range to act on the message. In the various aspects discussed herein, this determination can be performed at the PHY-MAC layer to reduce power consumption. If the receiving UE is within the threshold range, the second UE can enable application layer processing of the message. For example, zone ID/range information can be provided in sidelink control information (SCI). Additionally, in some aspects, direction-based control (e.g., beamforming/beam steering can be used to improve situational awareness and reduce RF congestion). It will be appreciated that if the first UE is moving, dynamic geo-fence boundaries can be generated around the first UE based on the range information associated with the message (e.g., zone ID, etc.). Accordingly, in addition to determining a zone/area/range for which the message is intended to be reliably received, discussed above, various aspects can determine to block or permit application layer processing of the message based on a range threshold.

The various aspects disclosed include techniques for determining proximity to a geo-fence and invoking action based on that proximity. An example action may be collision deterrence related actions. Other actions may include, but are not limited to, visual, audible, haptic or other warnings or commands indicating motion state changes. As noted above, existing wireless hazard alert systems require always-on broadcast and application layer message processing, resulting in increased power consumption and additional RF congestion. Various aspects of the disclosure, create a "moving geo-fence" by exposing 5G NR PC5 PHY-MAC embedded controls to the application layer. Various aspects of the disclosure also reduce device power consumption by repurposing 5G NR PC5 PHY-MAC control message mechanisms to enable or disable application layer message processing. For example, zone ID and/or range-based control (e.g. sidelink control information (SCI) range and/or zone ID parameters). Additionally, direction-based control (e.g. beam steering to improve situational awareness and reduce RF congestion) may be provided. The reduced power consumption can be obtained for battery-operated devices by disallowing upper layer processing and message transmission. High message reliability within the configured threshold range can be achieved through NR NACK-based reliability, discussed above. Additionally, dynamic geo-fence boundaries can be generated around a PC5-device based on real-time proximity to pedestrians, cyclists, animals, etc. Further, aspects of the present disclosure using PC5 provide greater range than other infrastructure-less vehicle communication, such as DSRC or IEEE 802.11p, which are also limited to broadcast operations.

According to various aspects disclosed herein, a proximity component can determine inter-UE range using two control message parameters, zone ID and/or range information. According to various aspects, zone ID can be the present UE location based on defined zones (as discussed herein) and range can be defined either as a discrete number of zones or absolute distance measurement. However, the various aspects disclosed herein are not limited to these examples. These two control message parameters can also be used at the PHY-MAC to control retransmission for high reliability. As noted above, the zone ID and range information can be used to determine the range between UEs at the PHY-MAC level. This allows for a virtual mobile geo-fence/dynamic geo-fence that moves with the UE. In contrast, conventional architectures have range/position determined at the application layer to provide a geo-fence which is power intensive. In some UE configurations, a separate application processor may have to be activated to perform application layer processing, whereas the PHY-MAC layer operations may be performed at the modem level for even further power savings.

Conventionally, the PHY-MAC control message parameters are not visible to the application layer. To provide for the various aspects of the disclosure, additional functional modules are provided to enable or disable application layer message processing based on the range and optionally direction determination (based on zone ID and range information) embedded in D2D/C-V2X communications (e.g., 5G NR PC5 communications), as discussed in the foregoing. As used herein, the terms D2D, C-V2X and/or PC5 information can include one or more application layer messages, control messages and/or information related to inter-UE range determination (e.g., zone ID, range, etc.). In accordance with various aspects disclosed, the D2D, C-V2X and/or PC5 information may be transmitted within a message container using the unicast sidelink mechanisms defined by the 3rd Generation Partnership Project (3GPP). Other aspects may transmit the D2D, C-V2X and/or PC5 information using other 3GPP cast types, such as broadcast or groupcast. Likewise, the term D2D, C-V2X and/or PC5 communication can include one or more application layer messages, control messages/information related to inter-UE range determination (e.g., zone ID, range, etc.) transmitted over an air interface (e.g., PC5 interface). For convenience of explanation, the term PC5 communication will be used in the following example, but it will be appreciated that the various aspects disclosed can be applied generally to D2D communications and devices.

Figure 9:
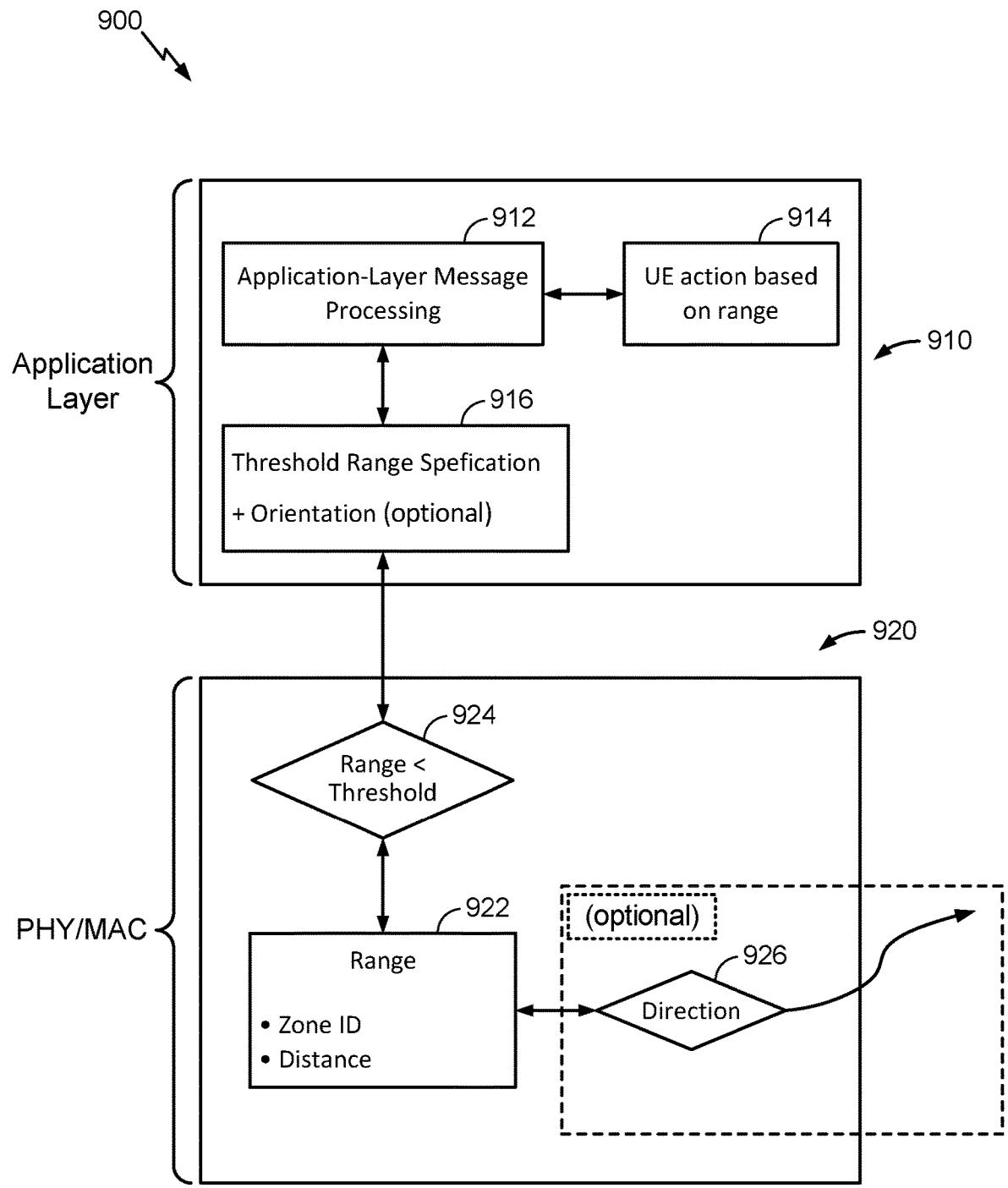
FIG. 9 illustrates an exemplary proximity device, represented as a series of interrelated functional modules in accordance with an aspect of the disclosure.

In FIG. 9, a proximity component 900 is illustrated (which may be similar to geo-fence component 170 in functionality). It will be appreciated that the various modules illustrated can communicate with each other in a bidirectional fashion and may perform different functions in a transmitting mode as opposed to a receiving mode. For example, in the application layer 910, an application layer based specification of a range threshold value (e.g., corresponding to the geo-fence dimension in number of zones, absolute distance, etc.) can be determined in the range specification module 916. Optionally, an orientation (including two or more dimensions) can be provided to focus the geo-fence to a specific vector/direction. The range threshold value can then be provided to the PHY-MAC layer 920. In a transmitting mode, the range threshold value can be provided to range module 922, which can then use this information to be included in the PC5 communication to identify the range (e.g., number of zones along with the devices current zone ID) for which the message is intended to be received (e.g., defining a geofence for the device). Optionally, the orientation information from range specification module 916 can be provided to the direction module 926 which can then steer the RF signals of the PC5 communication (including the range information) in a specific direction (e.g. toward a known road, etc.). In a receiving mode, optionally, an RX range threshold value can be used in the threshold detection module 924 to determine if the message received is within an RX threshold range, which may be different than a range that was received in a PC5 communication. This receiver based range setting allows for an alternative range control, separate from Tx based range control. Alternatively, the range threshold value may be determined at PHY-MAC layer 920 based on signal processing on the received communications (e.g., determined reliability threshold) and/or based on the range included in the PC5 communication from the transmitting device. In some aspects, the range in the PC5 communication defining a geographic area (e.g., zone ID and range) intended for the message, may be used to define the range threshold value. However, in other aspects, the range may not be provided in the PC5 communications or the range may be replaced by an RX range threshold value determined at the receiving UE. For example, a receiving UE may optionally define an RX range threshold value to specify a minimum range of 2 adjacent zones. Accordingly, if the range received in the PC5 communication message is less than 2, the RX range threshold value could be used by the threshold detection module 924 for determining whether the range threshold is met.

Regardless of where the range threshold value is specified (e.g., determined from the received message, specified at application layer, determined at PHY-MAC layer, etc.), the threshold detection module 924 can be configured to determine if an inter-UE range/range to the transmitting UE is within a threshold range (e.g., violates the geo-fence, proximity limit). For example, the range module 922 can determine information such as zone ID of the transmitting UE and/or range information (e.g., number of adjacent zones) from the received PC5 communication (e.g., in SCI as discussed therein) from the transmitting UE. This information can be used by range module 922 to determine if the receiving UE is within a threshold range. For example, being within the threshold range may be determined from the range threshold value (e.g., range received in the PC5 communication), the zone ID of the transmitting UE and the zone ID of the receiving UE (e.g., the zone ID of the receiving UE is within 2 adjacent zones of the transmitting UE). Additionally, it will be appreciated that the threshold range value may be determined so that proximity limit is violated if range determined is greater than a threshold in some aspects. Accordingly, the threshold range may be violated in some configurations when inter-UE range is less than the threshold range value and in other configurations, the threshold range may be violated when inter-UE range is greater than the threshold range value.

In contrast to conventional systems that use GPS location at the application layer, it will be appreciated that in various aspects disclosed herein, the inter-UE range can be determined at the PHY-MAC layer 920. For example, if the threshold detection module 924 determines based on the geographic location (e.g. zone ID) of the receiving UE (containing threshold detection module 924) that the inter-UE range is greater than range threshold value, subsequent application layer messages may not be passed to the application layer 910. Therefore, the application layer 910 modules would not be activated and power savings can be achieved, as discussed herein. Blocking messages from the application layer 910, reduces UE power consumption by reducing both UE upper-layer processing (e.g., modules 912, 914, etc.) and reducing unnecessary message transmission (e.g., attempts to respond to message). If the inter-UE range is not greater than range threshold value (e.g., within 2 adjacent zones), the application layer messages can be passed to the application layer 910. For example, the application layer messages can be passed to an application layer message processing module 912 and based on the content of the application layer messages, in some aspects, the UE action module 914 can initiate specific actions based on these messages. Application layer message elements can be provided to specify UE action, if the receiving UE is determined to be within the threshold range (e.g., within the geo-fence, proximity limit, number of adjacent zones, and/or absolute distance from the transmitting UE). For example, when inter-UE range is not greater than the range threshold value (e.g., the receiving UE is within a geo-fence for the transmitting UE) the receiving UE may perform one or more actions such as, initiate a warning (audio, haptic, and/or visual), initiate braking, steering, deceleration, and/or perform other actions to avoid collision. Examples of the various messages discussed herein are provided in the following paragraphs related to FIGS. 10 and 11.

As discussed above, the range threshold value may be derived from the PC5 communication received from the originating/transmitting UE based on the zone ID of the originating UE and range information. For example, the originating UE may provide its zone ID and range information (e.g., 1 adjacent zone), to define a geographic area which a message in the PC5 communication would be intended to be received and optionally acted upon. The receiving UE can then determine in range module 922 the originating UE zone ID and range information (e.g., 1 adjacent zone) from the PC5 communication. Threshold detection module 924 can use the geographic area (e.g., originator zone ID and range information) to determine if the current geographic location (e.g., zone ID of the receiving UE) is less than or equal to the range threshold value (e.g., 1 adjacent zone). For example, if the receiving UE has the same zone ID or is located within 1 adjacent zone ID of the originating UE zone ID, then the receiving UE is within the range threshold and the application layer processing would be enabled, as discussed above.

In an alternative example, as discussed above, an optional RX range threshold value may be established at the receiving UE (e.g., from application layer 910). The originating UE may only provide a zone ID in the PC5 communication (e.g., for some low power/limited devices) or the range provided may be overridden by the receiving UE based on its own RX range threshold value. If the receiving UE determines the RX range threshold value is 1 adjacent zone, then the results would be the same as the example with the range information (1 adjacent zone) provided in the PC5 communication from the originating UE. Alternatively, if receiving UE determines the RX range threshold value is 2 adjacent zones and is configured to override the range received in the PC5 communication, then application layer messages provided in the PC5 communication from the originating UE, would be processed at a greater inter-UE range (e.g., up to 2 adjacent zones, instead of 1).

It will be appreciated that the determination of the inter-UE range, may take any of the forms discussed herein and is not limited to this specific zone ID example. Further, it will be appreciated the zone ID and range information may represent any of a variety of configurations, as discussed herein. For example, the zone ID may be circular with a given radius about the originating/transmitting UE location. Alternatively, the zone ID may be rectangular and, for example, 1 adjacent zone may include 8 additional zones that are each adjacent to each side and corners of the rectangular zone, defined by the zone ID of the originating UE. Alternatively, the range may be defined as an absolute distance (e.g., 100 meters) from the geographic location of the originating/transmitting UE. Accordingly, it will be appreciated that the foregoing examples are provided merely for illustration and the specific examples should not be construed to limit the various aspects disclosed herein.

In accordance with some additional aspects, instead of a one-dimensional range, the range information can be two or three dimensional as determined by direction module 926, which allows for beam steering to focus the RF signals transmitted. The PHY-MAC layer 920 can optionally be configured to enable beam steering using direction module 926 to steer RF beam energy to the most situationally relevant location (e.g., toward a known roadway, intersection, transmitting UE, away from an obstruction, etc.). Focusing the RF signals/energy in a specific direction/vector can reduce unneeded RF congestion, RF noise and provide increased situational awareness.

The foregoing has discussed the function of component 900 from primarily a receiving standpoint. As discussed above, various modules can be used in transmitting operations. For example, a first UE be configured to transmit a message in a D2D communication (e.g., C-V2X, PC5, etc.). The message can include one or more data elements related to a geo-fence of the first UE. For example, the range specification module 916 can specify a range to be associated with the message. The range specification module 916 can also optionally determine an orientation of the first UE relative to a potential receiving UE (e.g., toward a roadway, intersection, rail line, away from obstruction, etc.). The range module 922 can identify the current geographic location of the first UE, which may be converted to a zone ID, and the range received from the range specification module 916 may be included with the zone ID to be transmitted (e.g., included in the SCI for a PC5 communication). The direction module 926 can optionally be used to steer RF signals (e.g., by beamforming and/or beam steering) to focus the energy of the transmission in a direction of the potential receiving UE based on the orientation.

FIG. 10 illustrates data elements that may be used to augment existing application layer standard messages or be part of new application layer messages. Application layer messages may include those defined by industry and government organizations, such as the Society of Automotive Engineers (SAE), the European Telecommunications Standards Institute-Intelligent Transportation Systems (ETSI-ITS), or others. Examples of existing application layer messages suitable for encapsulating application layer data elements (DEs) includes the SAE Personal Safety Message (PSM), which is defined in the SAE specification J2735 "Dedicated Short Range Communications (DSRC) Message Set Dictionary". For example, new application data elements related to ProximityAlertType, GeoFenceAlert and GeoFenceMotionInstruction may be included in the PSM according to various aspects disclosed herein. The PSM is one example of an existing application layer message defined by the SAE. Another example is a Basic Safety Message (BSM), however, it is noted the data elements defined herein could be readily included in other existing SAE application layer messages as well. It will also be appreciated that the new application data elements could alternatively be encapsulated in other messages for different standard groups (e.g., IEEE, 3GPP, etc.). Accordingly, the various aspects disclosed herein are not limited to the specific examples provided herein. According to some example aspects, the ProximityAlertType data element includes various entity types including pedestrian, cyclist, animal, vehicle and other. This data element can be used to alert a UE (e.g. vehicle, tag bearer, pedestrian, etc.) to the presence of an entity within a distance threshold (e.g., vehicle alerted to tag bearer or tag bearer alerted to vehicle). The GeoFenceAlert data element includes various warning or action types, such as an audible alert, haptic alert and other. This data element can be used for a direct warning action. The GeoFenceMotionInstruction data element can include an instruction to initiate movement by a UE (e.g., vehicle, a tag bearer, etc.) in the direction defined by an angle value (e.g., J2735 DE_Angle value). It will be appreciated that these messages, data elements and actions can aid in inter-UE range determination and detection of proximity to a geofence and/or can be used for various functions such as collision deterrence.

FIG. 11 illustrates new application layer messages according to aspects of the disclosure. For example, a new message such as a proximity alert message and selected elements thereof may be provided, as illustrated. The new message can enable both request and response interaction between UEs (e.g., vehicle and device/tag bearer). The proximity alert message may have message parts including originator parameters and proximity alert components. The originator parameters content may include identity, statistic characteristics, dynamic characteristics, type: proximity alert request, and type: proximity alert response, for example. The static characteristic identity may include a permanent UE identifier, such as a license plate number, VIN number for a vehicle, an issued identifying number of alphanumeric code for a UE associated with an animal, an existing number or alphanumeric code for a UE associated with pedestrian, cyclist, scooter or other non-vehicle road user, or a number or alphanumeric code assigned to the UE specifically for proximity-based geo-fence detection. Other static characteristics could include vehicle type, vehicle size, color, or other descriptive attributes. Static characteristics of cyclists, scooters, electric wheel balance boards, mopeds or users or other non-vehicles could include wheel size, physical size, color, number of permitted riders, or other static attributes. Dynamic characteristics could include attributes associated with the current and permitted motion states of the UE or device containing the UE. Vehicle dynamic characteristics could include location, speed, linear acceleration, attitude, angular velocity, where these five attributes are measured along three orthogonal axes. Additional vehicle dynamic parameters could include turning radius, stopping distance. The proximity alert components may include data elements including ProximityAlertType, GeoFenceAlert and GeoFenceMotionInstruction, according to various aspects disclosed herein. The ProximityAlertType data element includes various entity types including pedestrian, cyclist, animal and other. This data element can be used to alert a UE (e.g. vehicle, tag bearer) to the presence of an entity within a range threshold (e.g., vehicle alerted to tag bearer or tag bearer alerted to vehicle). The GeoFenceAlert data element includes various warning or action types, such as an audible alert, haptic alert and other. This data element can be used for a direct warning action. The GeoFenceMotionInstruction data element can include an instruction to initiate movement (e.g., by a tag bearer) in the direction defined by an angle value (e.g., J2735 DE_Angle value). It will be appreciated that these messages, data elements and actions can aid in inter-UE range determination, detection of proximity to a geofence and/or can be used for various functions, such as, collision deterrence.

Figure 12:
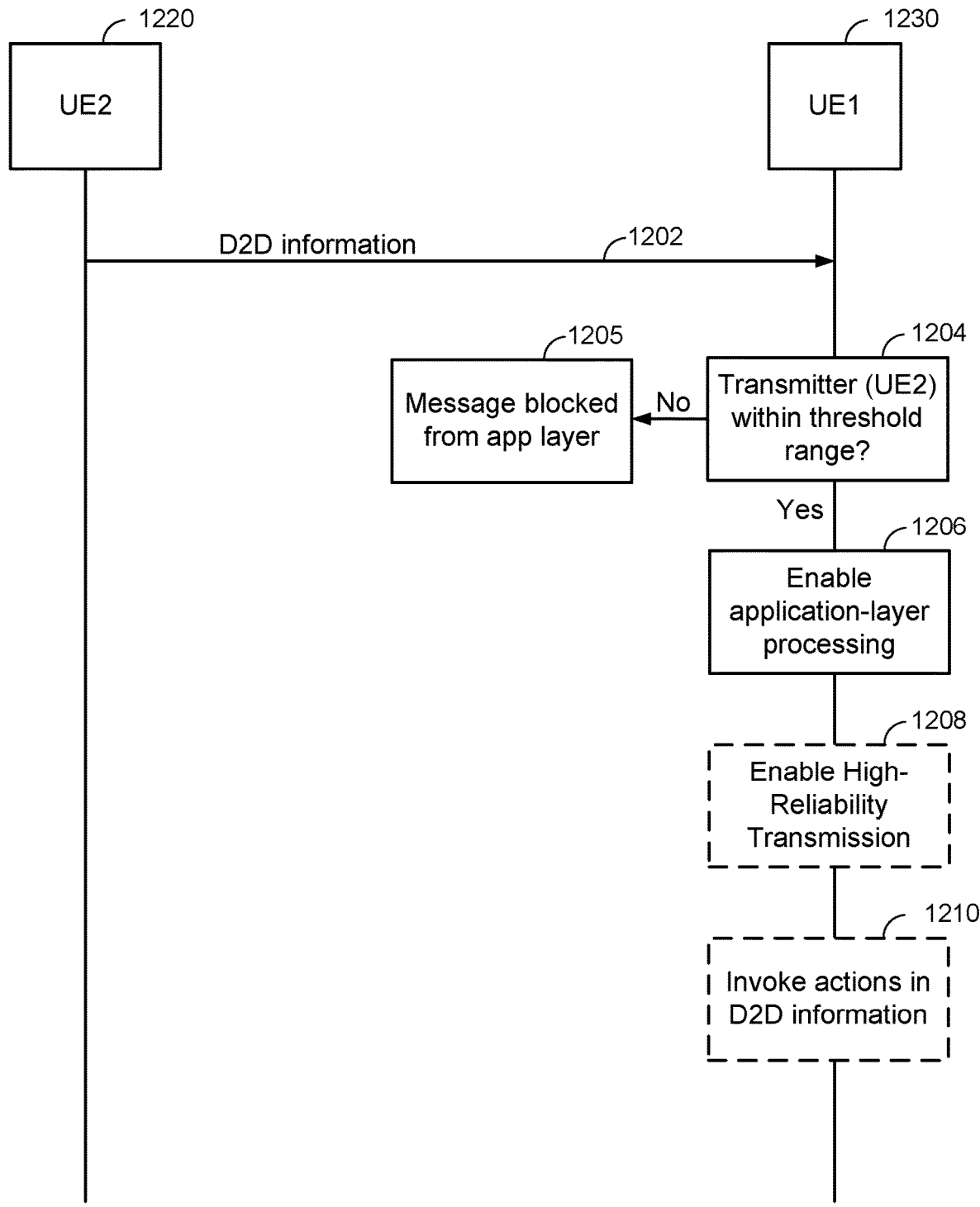
FIG. 12 illustrates example signaling between two UEs in accordance with aspects of the disclosure.

FIG. 12 illustrates an exemplary signal flow between a first UE (UE1) 1230 (e.g., transmitting UE) and a second UE (UE2) 1220. It will be appreciated that the UE2 1220 and UE1 1230 may be a variety of devices and the roles may change in various aspects. For example, in one aspect UE1 may be a vehicle and UE2 may be another device/tag bearer (e.g., another vehicle, pedestrian, cyclist, animal, livestock, construction equipment, farming equipment, etc.) according to various aspects of the disclosure. It will be appreciated that UE2 1220 and UE1 1230 may be similar to any of the UEs disclosed herein (e.g., UEs 104, 152, 160, 182, 190 in FIG. 1, UEs 240 depicted in FIGS. 2A and 2B, any of UEs 310, 350 in FIG. 3, etc.).

At 1202, D2D information (e.g., included in PC5 communication) is transmitted from UE2 1220 to UE1 1230. In some aspects, the PC5 communication may be or include an existing application layer message, such as a PSM, including new data elements (see, e.g., data elements in FIG. 10) Alternatively, the PC5 communication may consist of new application layer messages including the new data elements (see, e.g., data elements in FIG. 10). Upon receipt of the PC5 communication, a determination is made if the UE2 1220 (transmitting UE) is within the threshold range, at 1204. As discussed above, this determination can be performed at the PHY-MAC, and in some aspects may be performed without GPS assistance. If the UE2 1220 is determined not to be within the threshold range, the PC5 communication (e.g., application layer message, data elements, etc.) is not provided to the application layer, at 1205. If the UE2 1220 is determined to be within the threshold range, the PC5 communication is provided to the application layer and/or the application layer processing is enable for the received PC5 communication, at 1206. At 1208, optionally, a high reliability transmission is enabled by the UE1 1230 for communication with the UE2 1220. In some aspects, a high reliability transmission may include that when the transmitter and receiver are close enough, the receiver (e.g., UE1 1230) may affirmatively NACK a known transmission that was not received correctly or may be configured to affirmatively ACK received transmissions (as discussed in the foregoing). At 1210, optionally, the new data elements in the received D2D information (e.g., application layer message) are acted upon by the UE1 1230. For example, an alarm/alert could be activated, a movement initiated, etc. However, it will be appreciated that in some aspects, the message may not be acted upon directly.

It will be appreciated that in other aspects the message receiving UE, UE1 1230 may be the vehicle and the transmitting UE2 1220 may be a device/tag bearer (e.g., another vehicle, pedestrian, cyclist, animal, livestock, construction equipment, farming equipment, etc.) according to various aspects of the disclosure. Additionally, the D2D information is not limited to the PC5 communication and/or the application layer message examples used in the foregoing. Accordingly, it will be appreciated that the foregoing examples are provided merely for illustration and the specific examples should not be construed to limit of the various aspects disclosed herein.

Figure 13:
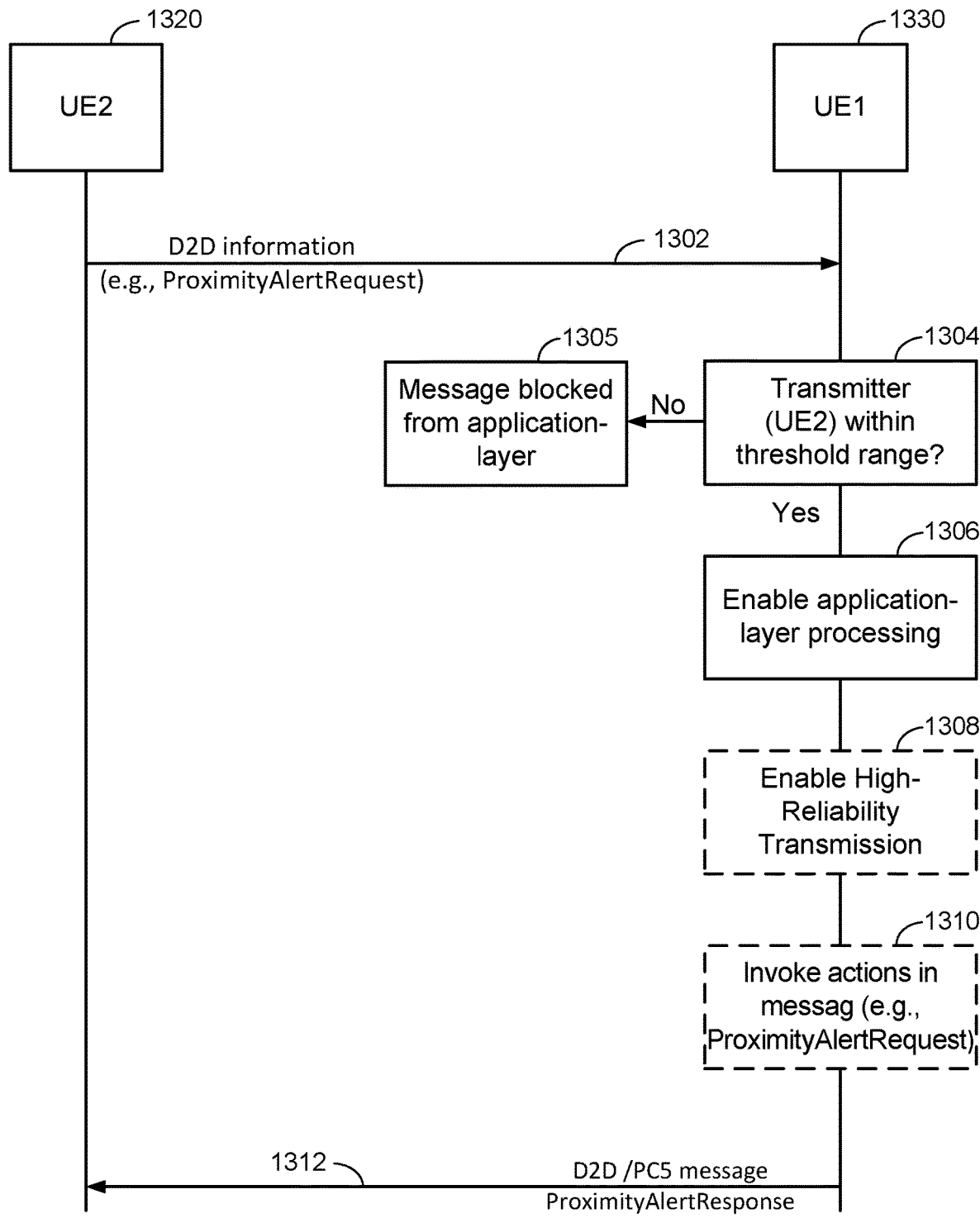
FIG. 13 illustrates example signaling between two UEs in accordance with aspects of the disclosure.

FIG. 13 illustrates an exemplary signal flow between a transmitting/originating UE2 1320 (e.g., a device/tag bearer) and a message receiving UE1 1330 (e.g., vehicle), according to aspects of the disclosure. It will be appreciated that the UE1 1330 and UE2 1320 may be a variety of devices and the roles may change in various aspects. For example, in one aspect UE2 1320 may be a vehicle and UE1 1330 may be another device/tag bearer (e.g., another vehicle, pedestrian, cyclist, animal, livestock, construction equipment, farming equipment, etc.) according to various aspects of the disclosure. It will be appreciated that UE2 1320 and UE1 1330 may be similar to any of the UEs disclosed herein (e.g., UEs 104, 152, 160, 182, 190 in FIG. 1, UEs 240 depicted in FIGS. 2A and 2B, any of UEs 310, 350 in FIG. 3, etc.).

At 1302, D2D information (e.g., a PC5 communication) is transmitted from UE2 1320 to a message receiving UE, UE1 1330. In some aspects, in contrast to the previous example using an existing message, the PC5 communication may be or include a new message, such as a ProximityAlertRequest (see, e.g., FIG. 11). Upon receipt of the PC5 communication, a determinations is made if the UE2 1320 (transmitting UE/transmitter) is within the threshold range, at 1304. As discussed above, this determination is performed at the PHY-MAC, and in some aspects may be performed without GPS assistance. If the UE2 1320 is determined not to be within the threshold range, the PC5 communication (e.g., new message, data elements, etc.) is not provided to the application layer, at 1305. If the UE2 1320 is determined to be within the threshold range, the PC5 communication is provided to the application layer and/or the application layer is enabled for processing the received PC5 communication, at 1306. At 1308, optionally, a high reliability transmission is enabled by UE1 1330 for communication with UE2 1320. As discussed above, in some aspects, a high reliability transmission may include that when the transmitter and receiver are close enough, the receiver (e.g., UE1 1330) may affirmatively NACK a known transmission that was not received or may be configured to affirmatively ACK received transmissions. At 1310, optionally, the actions specified in in the PC5 communication (e.g., ProximityAlertRequest) are acted upon by the UE1 1330. At 1312, the PC5 communication (e.g., ProximityAlertRequest) from UE2 1320 is responded to (e.g., ProximityAlertResponse) in a transmission from the UE1 1330 back to UE2 1320. In some aspects, the ProximityAlertResponse may contain similar elements such as alert type, geofence alert action, receivers location (optionally), an entity identifier (i.e. a vehicle ID number, VIN, etc.), geofence motion instructions accepted or to be initiated.

It will be appreciated that the D2D information is not limited to the PC5 communication, ProximityAlertRequest and/or ProximityAlertResponse examples used in the foregoing. Accordingly, it will be appreciated that the foregoing examples are provided merely for illustration and the specific examples should not be construed to limit of the various aspects disclosed herein.

Figure 14:
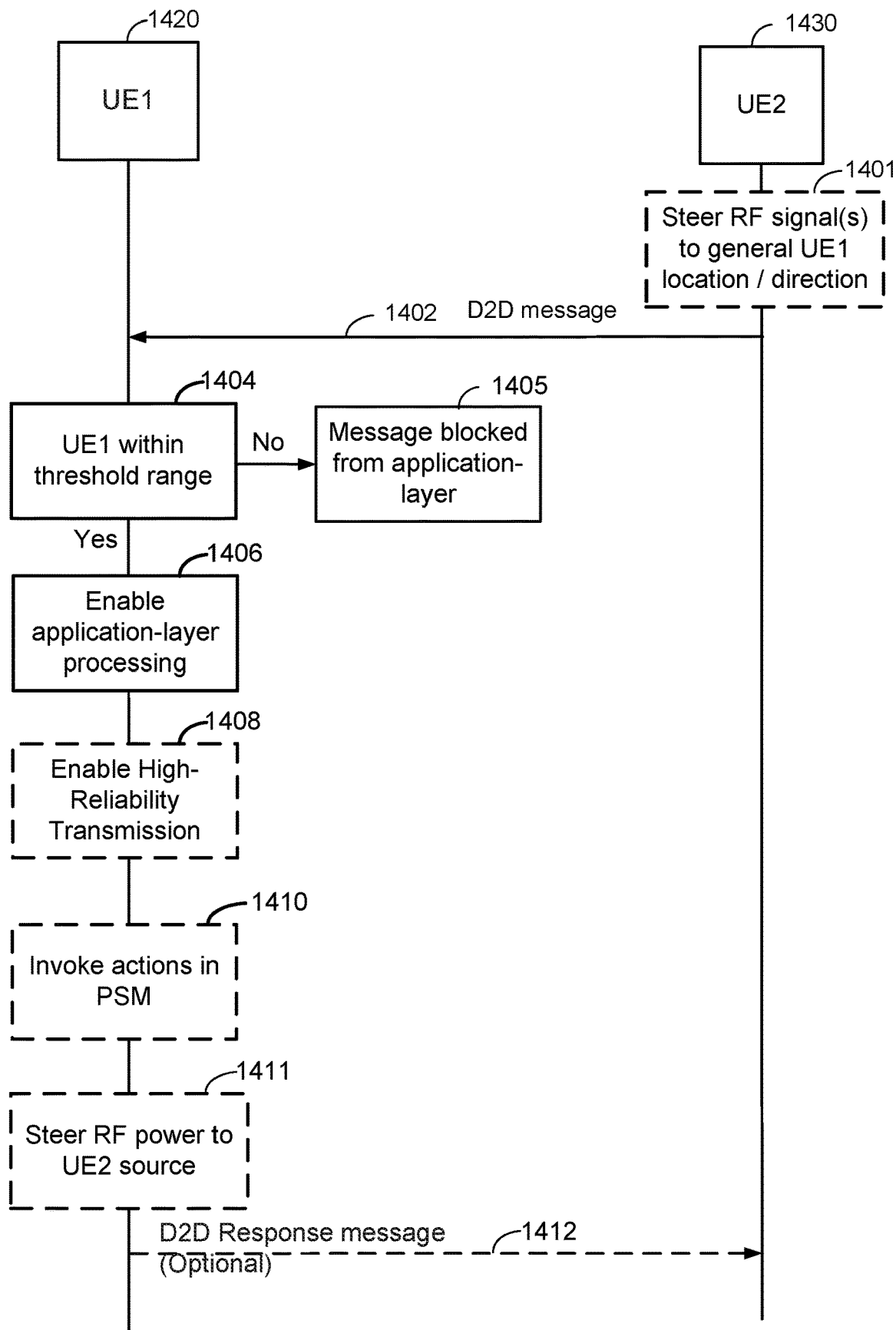
FIG. 14 illustrates example signaling between two UEs in accordance with aspects of the disclosure.

FIG. 14 illustrates an exemplary signal flow between a first UE, UE1 1420, (e.g., message receiving UE) and a second UE, UE2 1430, (e.g., transmitting UE), according to some aspects of the disclosure. For example, in one aspect UE1 1420 may be a vehicle and UE2 1430 may be another device/tag bearer (e.g., another vehicle, pedestrian, cyclist, animal, livestock, construction equipment, farming equipment, etc.) according to various aspects of the disclosure. It will be appreciated that UE1 1420 and UE2 1430 may be similar to any of the UEs disclosed herein (e.g., UEs 104, 152, 160, 182, 190 in FIG. 1, UEs 240 depicted in FIGS. 2A and 2B, any of UEs 310, 350 in FIG. 3, etc.).

At 1401, the transmitting UE2 1430 can optionally, steer RF signals transmitted toward UE 1420 as part of a D2D message/information (e.g., PC5 communications such as discussed above) being transmitted from UE2 1430 to UE1 1420, at 1302. It will be appreciated that beamforming and/or beam steering may be used to direct the RF signals transmitted/RF transmission power toward a general location/direction of UE1 1420. For example, even if UE2 1430 does not know the specific location of UE1 1420 (or even if there is a UE1 1420) it may be able to direct the RF signals transmitted toward a location or direction where a UE is likely to be (e.g., road, intersection, bicycle path, hiking path, railway, etc.). It will be appreciated that the optional RF steering aspect may reduce RF/channel congestion, improve transmission reliability, and reduce power consumption among other benefits. For example, if UE2 1430 is a pedestrian in an urban environment, the initial beam steering could be based on the pedestrian's orientation and/or direction of motion and any roads or intersections in the orientation and/or direction of motion of the pedestrian. The RF signals transmitted/RF transmission power would not be directed towards adjacent buildings, behind the pedestrian, etc. to reduce power consumed by the device and improve reliable transmission by reducing RF noise floor, which improve the performance of the transmitting device and other devices in the wireless communications network. Likewise, if UE2 1430 was a tagged animal in a rural environment, the initial beam steering could be directed towards a known road, intersection, hiking path, etc. based on an orientation and/or direction of motion of the tagged animal. The RF signals transmitted/RF transmission power would not be directed towards off-road areas which could reduce power consumed by the device.

Regardless of the transmission technique, upon receipt of the PC5 communication, a determination is made if the UE1 1420 is within the threshold range, at 1404. As discussed above, this determination can be performed at the PHY-MAC, and in some aspects may be performed without GPS assistance. Additionally, in some aspects, it may be determined that UE2 is within the threshold range, as the determination is based on the inter-UE range/distance between UE1 and UE2, as discussed in the foregoing. If the UE1 1420 is determined not to be within the threshold range, the PC5 communication (e.g., application layer message) is not provided to the application layer, at 1405. If the UE1 1420 is determined to be within the threshold range, the PC5 communication is provided to the application layer and in some aspects the application layer processing is enabled to process the received PC5 communication, at 1406. Optionally, at 1408, high reliability transmission is enabled at the UE1 1420 for communication with the UE2 1430, as discussed in the foregoing disclosure. At 1410, optionally, the actions specified in in the PC5 communication (e.g., application layer message, ProximityAlertRequest, etc.) are acted upon by the UE1 1420. At 1411, optionally, UE1 1430 can steer the RF signals toward UE2 1430 when responding to the D2D message/information (e.g., PC5 communications such as discussed above) being received from UE2 1430.

For example, the D2D/PC5 communication from UE2 1430 (e.g., application layer message, ProximityAlertRequest, etc.) may include a request a response, which can be responded to (e.g., ProximityAlertResponse) in a transmission from the UE1 1420 back to UE2 1430, at 1412.

Figure 15:
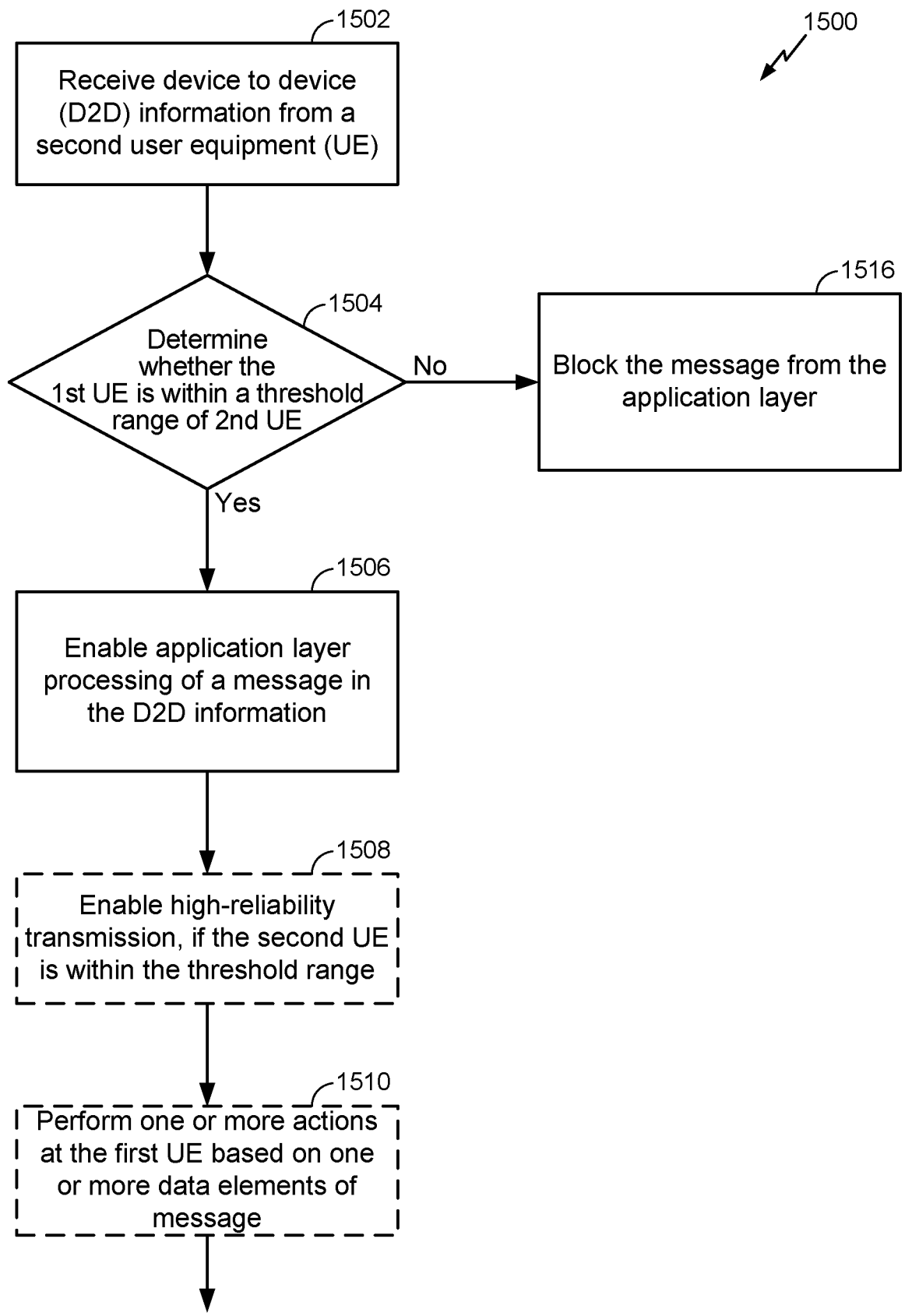
FIG. 15 illustrates an example flowchart of at least one method in accordance with an aspect of the disclosure.

It will be appreciated that in other aspects the message receiving UE, UE1 1420 may be another device/tag bearer (e.g., another vehicle, pedestrian, cyclist, animal, livestock, construction equipment, farming equipment, etc.) according to various aspects of the disclosure. Additionally, the beamforming/beam steering aspects discussed above may be used in some configurations but not in others. For example, the RF signal/beam steering of 1401 of the D2D information transmission 1402 may be used regardless of whether there will be a response to D2D information and/or RF signal/beam steering (e.g., 1411) used in the response. Likewise, in some aspects, the RF signal/beam steering 1411 of the response to the D2D information may be used regardless of whether RF signal/beam steering was used in the transmission of the D2D information. Accordingly, it will be appreciated that the foregoing examples are provided merely for illustration and the specific examples should not be construed to limit of the various aspects disclosed herein.

will be appreciated from the foregoing that the various aspects discussed and disclosed herein include methods for determining a proximity to a geo-fence and optionally invoking actions based on the proximity for various applications, such as collision deterrence. FIG. 15 illustrates a flowchart of method 1500 according to at least one aspect of the disclosure. The method 1500 may be performed by a first UE (e.g., similar to any of the UEs disclosed herein (e.g., UEs 104, 152, 160, 182, 190 in FIG. 1, UEs 240 depicted in FIGS. 2A and 2B, any of UEs 310, 350 in FIG. 3, etc.). At block 1502, the first UE (e.g., vehicle, tag bearer, pedestrian, etc.) receives device-to-device (D2D) information from a second UE (e.g., vehicle, tag bearer, pedestrian, etc.). At block 1504, the first UE can determine whether the first UE is within a threshold range from the second UE based on the D2D information (e.g., as noted above this can be performed at the PHY-MAC layer). At block 1506, the first UE can enable application layer processing of a message in the D2D information (e.g., this can include new data elements contained in existing application layer messages (e.g., SAE PSM) or new messages, as discussed above), if the first UE is within the threshold range (i.e., "Yes" in the flowchart). At block 1516, the first UE can block the message from the application layer (e.g., at the PHY-MAC as discussed above), if the first UE is not within the threshold range (i.e., "No" path in the flowchart). As discussed in the foregoing, this can allow for significant power savings, since the application layer processor and/or processing functions would not be initialized. At block 1508, the first UE can optionally enable high reliability transmission, if the first UE is within the threshold range. For example, as discussed above, to improve reliability, feedback may be sent back from the receiving UE (first UE). For example, if the first UE does not correctly receive the D2D information (e.g., PC5 communication), the first UE may transmit a NACK, (e.g., via PC5 communications) indicating to the second UE that there was an error in receiving the message. In response to the NACK, the second UE may retransmit the message. Additionally, beamforming and/or beam steering may also be used to steer the RF signals/beams toward the second UE, as discussed above. At block 1510, the first UE can optionally, perform one or more actions at the first UE based on one or more data elements of the message (e.g., alerts, motion, etc. as discussed in the foregoing). It will be appreciated from the disclosure herein that other methods and variations of methods can be recognized and detailed flowcharts and/or discussion of each will not be provided. For example, in various aspects, a response to the received D2D information may be transmitted from the first UE to the second UE. The transmitted response may optionally use beamforming/beam steering to more precisely direct the RF transmission to the second UE, as discussed herein. Accordingly, the various aspects of the disclosure should not be construed to be limited to the illustrative examples provided.

Figure 16A:
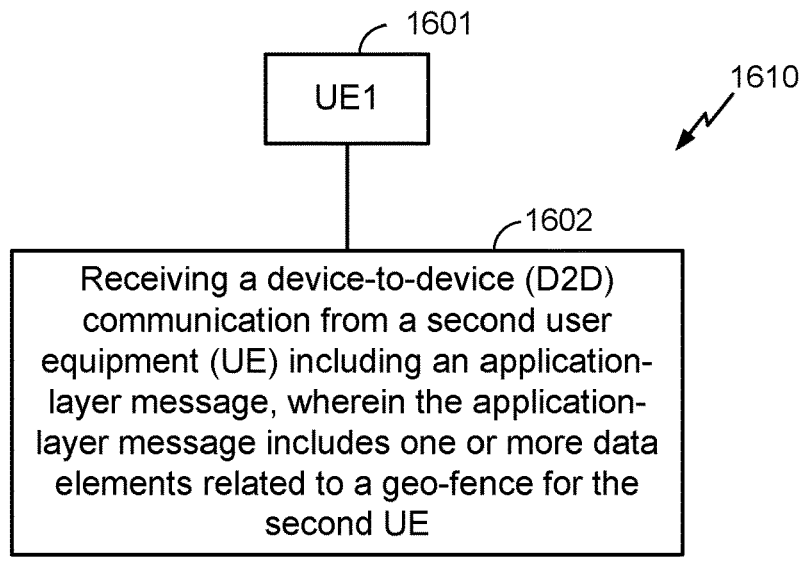
FIG. 16A illustrates an example flowchart of at least one method in accordance with an aspect of the disclosure.

It will be appreciated from the foregoing that the various aspects discussed and disclosed herein include methods for transmitting an application layer message (e.g., personal safety message), which may include new data elements discussed herein (e.g., see FIG. 10) and/or new messages (e.g., see FIG. 11) related to a geo-fence of a transmitting UE. FIG. 16A illustrates a flowchart of method 1610. The method 1610 for wireless communication is performed at a first user equipment (UE) 1601. In block 1602, the first UE receives a device-to-device (D2D) communication from a second user equipment (UE) including an application layer message (either an existing message, such as the PSM or a new message) that includes one or more data elements related to a geo-fence for the second UE. In various other aspects the application layer message (either an existing message, such as the PSM or a new message) can be included as the message included in the D2D information including the range information to allow for the determination of the geo-fence and geo-fence violations, as detailed in the foregoing. Likewise, the first UE and second UE may be any of the various UEs disclosed herein. Accordingly, it will be appreciated from the disclosure herein that other methods and variations of methods can be recognized and detailed flowcharts and/or discussion of each will not be provided. Accordingly, the various aspects of the disclosure should not be construed to be limited to the illustrative examples provided.

Figure 16B:
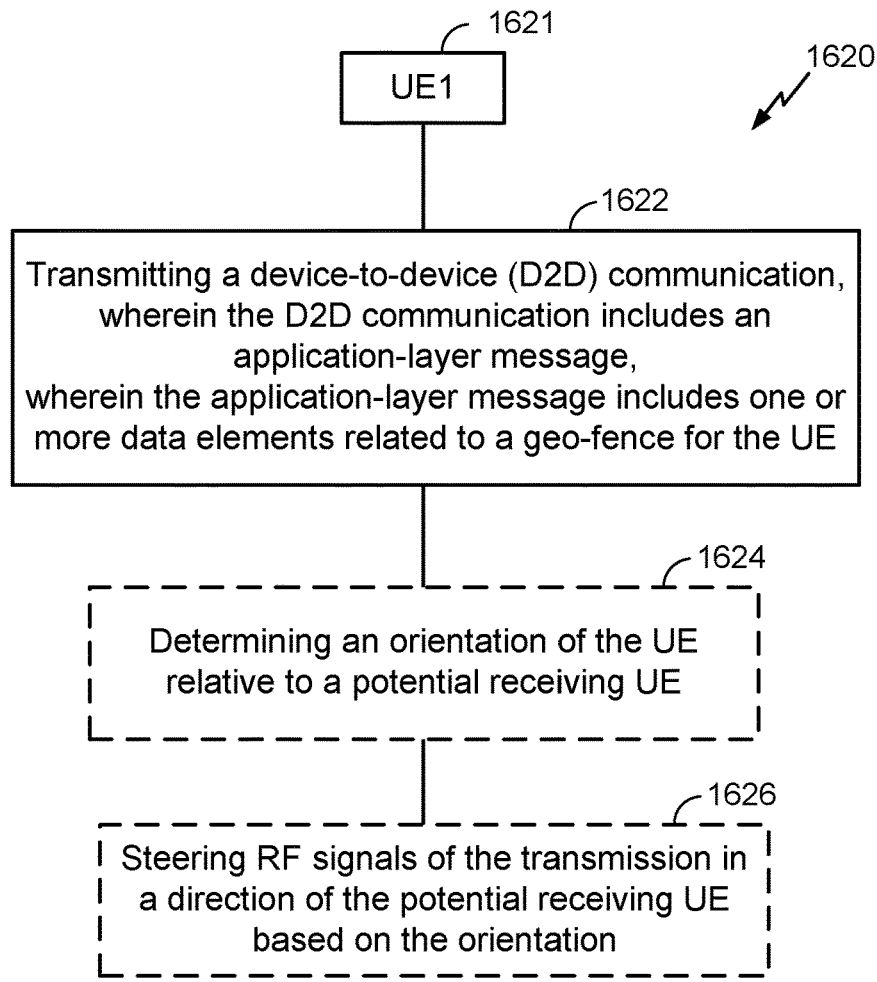
FIG. 16B illustrates an example flowchart of at least one method in accordance with an aspect of the disclosure.

FIG. 16B illustrates a flowchart of method 1620. The method 1620 for wireless communication is performed at a user equipment (UE) 1621. At 1622 the UE transmits a device-to-device (D2D) communication, wherein the D2D communication includes an application layer message (e.g., either an existing message, such as the PSM with new data elements or a new message) and the application layer message includes one or more data elements related to a geo-fence for the UE. The method can optionally include at 1624 determining an orientation of the UE relative to a potential receiving UE. It will be appreciated an orientation/direction towards one or more potential receiving UEs (e.g., toward a road, away from an obstruction, etc., as discussed in the foregoing). The term potential receiving UEs is used as the transmitting UE may not know if there are any UEs within a transmission range that can receive the transmission. The method can also optionally include at 1626 steering RF signals of the transmission in a direction of the potential receiving UE based on the orientation. As discussed above, steering the RF signals can be performed by beamforming and/or beam steering to focus the RF signals/transmission power, which can reduce energy consumption, improve situational awareness and reduce RF congestion among other benefits, as discussed herein.

In various other aspects the UE can determine a geographic location (e.g., zone ID, area ID, etc.) of the UE and a range for the geo-fence, which can be used for the D2D information the determination of the geo-fence and geo-fence violations, as detailed in the foregoing. Likewise, the UE and potential receiving UE may be any of the various UEs disclosed herein. Accordingly, it will be appreciated from the disclosure herein that other methods and variations of methods can be recognized and detailed flowcharts and/or discussion of each will not be provided. Accordingly, the various aspects of the disclosure should not be construed to be limited to the illustrative examples provided.

The functionality of the various devices, components, methods, etc. disclosed herein may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

Figure 17:
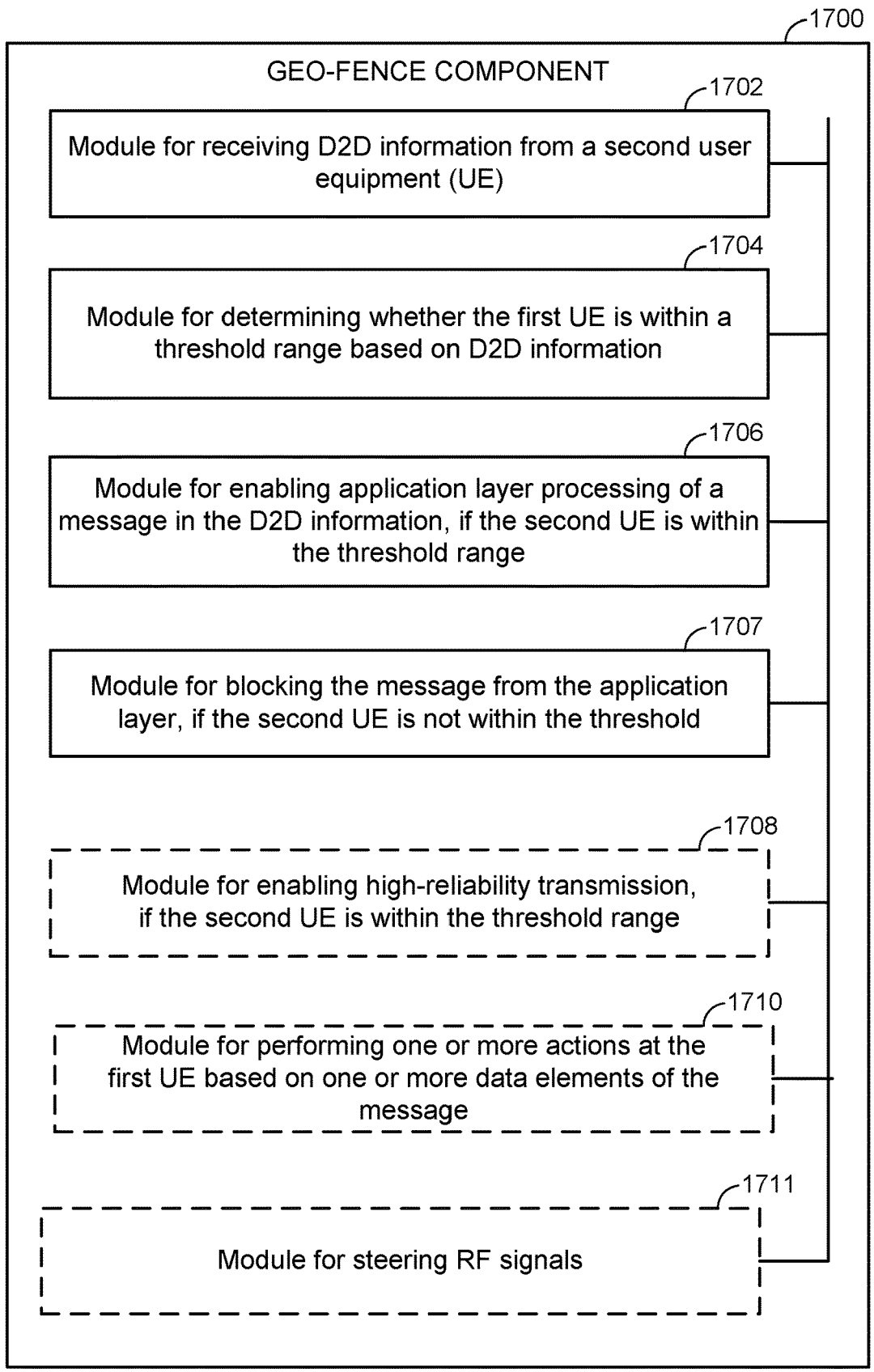
FIG. 17 illustrates an example device represented as a series of interrelated functional modules in accordance with an aspect of the disclosure.

FIG. 17 illustrates an example proximity-based geo-fence device 1700 (which may be similar to geo-fence component 170 and/or component 900) for implementing various aspects of the disclosure, which are represented as a series of interrelated functional modules. The device 1700 may correspond to any of the UEs disclosed herein (e.g., UEs 104, 152, 160, 182, 190 in FIG. 1, UEs 240 depicted in FIGS. 2A and 2B, any of UEs 310, 350 in FIG. 3, etc.). In the illustrated example, a module 1702 for receiving D2D information (e.g., a PC5 communication) from a second user equipment (UE); may correspond at least in some aspects to, for example, a communication device (e.g., transceiver 804 and/or a processing system (e.g., processors 810), etc.) as discussed herein. A module 1704 for determining whether the first UE is within a threshold range (inter-UE range between first UE and second UE, as discussed above) based on the D2D information, may correspond at least in some aspects to, for example, a communication device (e.g., transceiver 804, and/or a processing system, e.g., processor 810) and in some aspects may be functions of the PHY-MAC layers (e.g., including functionality such as range module 922 and/or threshold detection module 924) of a modem processor, as discussed herein. A module 1706 for enabling application layer processing of one or more data elements of the D2D information received, if the first UE is within the threshold range, and may correspond at least in some aspects to, for example, a processing device (e.g., processor 810, etc.) as discussed herein and in some aspects to an application layer processor that performs processing at an application layer (e.g., 910). A module 1707 for blocking the message from the application layer, if the first UE is not within the threshold range, may correspond at least in some aspects to, for example, a communication device (e.g., transceiver 804 and/or a processing system e.g., processor 810) and in some aspects may be functions of the PHY-MAC layers (e.g., threshold detection module 924) of a modem processor, as discussed herein. An optional module 1708, for enabling high reliability transmission, if the first UE is within a threshold range from the second UE, may correspond at least in some aspects to a communication device (e.g., transceiver 804 and/or a processing system, e.g., processor 810). Another optional module 1710 for performing one or more actions at the first UE based on the one or more data elements in the message, may be for example, a processing system (e.g., processor 810) or may be an application processor configured to perform functions at the application layer (e.g., 910, 914), as discussed herein. Another optional module 1711, for steering RF signals of the transmission, may correspond at least in some aspects to a communication device (e.g., transceiver 804 and/or a processing system, e.g., processor 810) and in some aspects may be functions of the PHY-MAC layers (e.g., direction module 926) and/or beam forming functions of a modem processor, as discussed herein. It will be appreciated that depending on the configuration, module 1711 may be used for steering RF signals in an initial (originating) transmission toward an intended direction and/or for steering RF signals toward an originating UE, when responding to the transmissions from the originating UE, as discussed herein.

In addition, the modules, components and/or functions represented by FIGS. 9 and 17, as well as other modules, components and/or functions described herein, may be implemented using any suitable means. Such means also may be implemented, at least in part, using corresponding structure as taught herein. For example, the components described above in conjunction with the "module for" also may correspond to similarly designated "means for" functionality. Thus, in some aspects one or more of such means may be implemented using one or more processors, memory, integrated circuits, or other suitable structure as taught herein, including as an algorithm. One skilled in the art will recognize in this disclosure an algorithm may be represented in the functions, actions, etc. described above, as well as in sequences of actions that may be represented by pseudo-code. For example, the components, modules and/or functions represented by FIGS. 9 and 17 may include code for performing the functions, aspects and actions disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communication at a first user equipment (UE), comprising:
   receiving device-to-device (D2D) information from a second user equipment (UE);
   determining whether the first UE is within a threshold range from the second UE based on the D2D information;
   enabling application layer processing of a message in the D2D information in response to a determination that the first UE is within the threshold range from the second UE, wherein the first UE is determined to be within the threshold range from the second UE, based on a determination that a geographic location of the first UE is within a geographic area associated with the message; and
   blocking the message from the application layer in response to a determination that the first UE is not within the threshold range from the second UE.

2. The method of claim 1, wherein the D2D information is received over one of a unicast, groupcast or broadcast sidelink transmission from the second UE.

3. The method of claim 2, wherein the D2D information is received over a Long Term Evolution (LTE) Vehicle-to-Everything (V2X) PC5 interface.

4. The method of claim 1, further comprising:
   performing one or more actions at the first UE based on the message.

5. The method of claim 4, wherein the one or more actions include at least one of an audible alert, a haptic alert, an instruction to initiate movement, an instruction for braking or an instruction for steering.

6. The method of claim 1, wherein the geographic area indicates a radius surrounding a geographic location of the second UE.

7. The method of claim 1, wherein the geographic area comprises a non-circular area.

8. The method of claim 1, wherein the geographic area comprises a preconfigured area.

9. The method of claim 8, further comprising:
   receiving an update of the preconfigured area.

10. The method of claim 1, wherein the geographic area is derived from sidelink control information (SCI) for the message.

11. The method of claim 10, wherein the geographic area includes at least one of a zone identifier (ID) or a range, wherein the zone ID based on a geographic location of the second UE.

12. The method of claim 11, wherein the range is a discrete number of zones.

13. The method of claim 11, wherein the range is a distance.

14. The method of claim 1, wherein determining whether the first UE is within the threshold range from the second UE is performed at a physical layer (PHY) and/or media access control layer (MAC) (PHY-MAC) based on the geographic area associated with the message and a range threshold value.

15. The method of claim 14, further comprising:
   specifying a range threshold value at the application layer; and
   providing the range threshold value to the PHY-MAC.

16. The method of claim 14, further comprising:
   determining the range threshold value at the PHY-MAC, based on at least one of a predefined value, a value associated with a type of the second UE, or signal processing performed on the message.

17. The method of claim 14, wherein the geographic area includes a zone ID and is derived from sidelink control information (SCI) for the message.

18. The method of claim 17, wherein the range threshold value is a discrete number of zones.

19. The method of claim 17, wherein the range threshold value is a distance.

20. The method of claim 1, further comprising:
in response to the determination that the first UE is within the threshold range from the second UE, sending an acknowledgement message to the second UE to indicate whether data was received correctly from the second UE.

21. The method of claim 20, further comprising:
transmitting a negative acknowledgment (NACK) to the second UE, if the message is not received correctly.

22. The method of claim 20, further comprising:
transmitting a positive acknowledgment (ACK) to the second UE, if the message is received correctly.

23. The method of claim 1, further comprising:
determining an orientation of the first UE relative to the second UE.

24. The method of claim 23, further comprising:
transmitting a response to the second UE by steering RF signals of the transmission in a direction of the second UE based on the orientation.

25. The method of claim 24, wherein the steering RF signals is performed by beamforming and/or beam steering.

26. The method of claim 23, further comprising:
focusing RF signals received from the second UE based on the orientation.

27. The method of claim 26, wherein focusing the RF signals is performed by beamforming.

28. The method of claim 1, wherein the message includes a response request.

29. The method of claim 28, further comprising:
transmitting a response to the second UE based, if the first UE is within the threshold range from the second UE.

30. The method of claim 29, wherein the message is a proximity alert message and wherein the response is a proximity alert response.

31. The method of claim 1, wherein the first UE is a vehicle, a device associated with a pedestrian, a device associated with a cyclist, a device associated with an animal, construction equipment, farming equipment or a tag bearer.

32. The method of claim 1, wherein the second UE is a vehicle, a device associated with a pedestrian, a device associated with a cyclist, a device associated with an animal, construction equipment, farming equipment or a tag bearer.

33. A first user equipment (UE) comprising:
a memory;
a transceiver; and
at least one processor coupled to the memory and to the transceiver, configured to:
receive device-to-device (D2D) information from a second user equipment (UE); determine whether the first UE is within a threshold range from the second UE based on the D2D information;
enable application layer processing of a message in the D2D information in response to a determination that the first UE is within the threshold range from the second UE, wherein the first UE is determined to be within the threshold range from the second UE, based on a determination that a geographic location of the first UE is within a geographic area associated with the message; and
block the message from the application layer in response to a determination that the first UE is not within the threshold range from the second UE.

34. The first UE of claim 33, wherein the D2D information is received over one of a unicast, groupcast or broadcast sidelink transmission from the second UE.

35. The first UE of claim 34, wherein the D2D information is received over a Long Term Evolution (LTE) Vehicle-to-Everything (V2X) PC5 interface.

36. The first UE of claim 33, wherein the at least one processor is further configured to:
perform one or more actions at the first UE based on the message.

37. The first UE of claim 33, wherein the geographic area is derived from sidelink control information (SCI) for the message.

38. The first UE of claim 37, wherein the geographic area includes at least one of a zone identifier (ID) or a range, wherein the zone ID based on a geographic location of the second UE.

39. The first UE of claim 38, wherein the range is a discrete number of zones.

40. The first UE of claim 38, wherein the range is a distance.

41. The first UE of claim 33, wherein determining whether the first UE is within the threshold range from the second UE is performed at a physical layer (PHY) and/or media access control layer (MAC) (PHY-MAC) based on the geographic area associated with the message and a range threshold value.

42. The first UE of claim 41, wherein the at least one processor is further configured to:
specify a range threshold value at the application layer; and
provide the range threshold value to the PHY-MAC.

43. The first UE of claim 41, wherein the at least one processor is further configured to:
determine the range threshold value at the PHY-MAC, based on at least one of a predefined value, a value associated with a type of the second UE, or signal processing performed on the message.

44. The first UE of claim 41, wherein the geographic area includes a zone ID and is derived from sidelink control information (SCI) for the message.

45. The first UE of claim 33, wherein the at least one processor is further configured to:
in response to the determination that the first UE is within the threshold range from the second UE, sending an acknowledgement message to the second UE to indicate whether data was received correctly from the second UE.

46. The first UE of claim 45, wherein the transceiver is configured to transmit a negative acknowledgment (NACK) to the second UE, if the message is not received correctly.

47. The first UE of claim 45, wherein the transceiver is configured to:
transmit a positive acknowledgment (ACK) to the second UE, if the message is received correctly.

48. The first UE of claim 33, wherein the at least one processor is further configured to:
determine an orientation of the first UE relative to the second UE.

49. The first UE of claim 48, wherein the transceiver configured to transmit a response to the second UE by steering RF signals of the transmission in a direction of the second UE based on the orientation.

50. The first UE of claim 33, wherein the message includes a response request.

51. The first UE of claim 50, wherein the transceiver configured to transmit a response to the second UE based, if the first UE is within the threshold range from the second UE.

52. The first UE of claim 33, wherein the first UE is a vehicle, a device associated with a pedestrian, a device associated with a cyclist, a device associated with an animal, construction equipment, farming equipment or a tag bearer and wherein the second UE is a vehicle, a device associated with a pedestrian, a device associated with a cyclist, a device associated with an animal, construction equipment, farming equipment or a tag bearer.

53. A first user equipment (UE) comprising:
- means for receiving device-to-device (D2D) information from a second user equipment (UE);
- means for determining whether the first UE is within a threshold range from the second UE based on the D2D information;
- means for enabling application layer processing of a message in the D2D information in response to a determination that the first UE is within the threshold range from the second UE, wherein the first UE is determined to be within the threshold range from the second UE, based on a determination that a geographic location of the first UE is within a geographic area associated with the message; and
- means for blocking the message from the application layer in response to a determination that the first UE is not within the threshold range from the second UE.

54. A non-transitory computer-readable medium storing computer-executable instructions for wireless communication at a first user equipment (UE), the computer-executable instructions, when executed by at least one processor, cause the at least one processor to perform operations comprising:
- receiving device-to-device (D2D) information from a second user equipment (UE);
- determining whether the first UE is within a threshold range from the second UE based on the D2D information;
- enabling application layer processing of a message in the D2D information in response to a determination that the first UE is within the threshold range from the second UE, wherein the first UE is determined to be within the threshold range from the second UE, based on a determination that a geographic location of the first UE is within a geographic area associated with the message; and
- blocking the message from the application layer in response to a determination that the first UE is not within the threshold range from the second UE.

* * * * *